(12) United States Patent
Cho et al.

(10) Patent No.: US 11,650,623 B2
(45) Date of Patent: May 16, 2023

(54) DISPLAY DEVICE

(71) Applicant: LG ELECTRONICS INC., Seoul (KR)

(72) Inventors: Dongwoo Cho, Seoul (KR); Hyungkwon Yun, Seoul (KR); Jungyul Sakong, Seoul (KR); Munhwan Kim, Seoul (KR); Changwan Noh, Seoul (KR); Junghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/595,498

(22) PCT Filed: Jul. 8, 2019

(86) PCT No.: PCT/KR2019/008358
§ 371 (c)(1),
(2) Date: Nov. 17, 2021

(87) PCT Pub. No.: WO2020/262750
PCT Pub. Date: Dec. 30, 2020

(65) Prior Publication Data
US 2022/0221903 A1 Jul. 14, 2022

(30) Foreign Application Priority Data
Jun. 24, 2019 (KR) .......................... 10-2019-0074975

(51) Int. Cl.
*G06F 1/16* (2006.01)
*G06F 1/20* (2006.01)

(52) U.S. Cl.
CPC ............. *G06F 1/1607* (2013.01); *G06F 1/20* (2013.01)

(58) Field of Classification Search
CPC ................................. G06F 1/1607; G06F 1/20
See application file for complete search history.

(56) References Cited

U.S. PATENT DOCUMENTS

| | | | |
|---|---|---|---|
| 6,268,998 B1 * | 7/2001 | Cho ..................... | G06F 1/1601 248/920 |
| 6,912,120 B2 * | 6/2005 | Kim ..................... | F16M 11/10 361/679.06 |

(Continued)

FOREIGN PATENT DOCUMENTS

| | | |
|---|---|---|
| JP | 2018067079 | 4/2018 |
| KR | 101673012 | 11/2016 |

(Continued)

OTHER PUBLICATIONS

PCT International Application No. PCT/KR2019/008358, International Search Report dated Mar. 24, 2020, 5 pages.

*Primary Examiner* — Adrian S Wilson
(74) *Attorney, Agent, or Firm* — Lee Hong Degerman Kang Waimey

(57) ABSTRACT

A display device is disclosed. The display device may comprise a display panel; a frame disposed behind the display panel and coupled to the display panel; a stand configured to support the frame at a lower part of the display panel; a bottom accommodation portion fixed to a lower part of the stand, the bottom accommodation portion having an inner space that is opened rearward; and a box slidably inserted into the inner space, the box having an accommodation space provided inside the box.

10 Claims, 23 Drawing Sheets

(56) References Cited

U.S. PATENT DOCUMENTS

| | | | | |
|---|---|---|---|---|
| 7,267,312 | B2* | 9/2007 | Kang | F16M 11/10 16/337 |
| 7,268,999 | B2* | 9/2007 | Kim | G06F 1/1601 248/371 |
| 7,274,557 | B2* | 9/2007 | North | F16M 11/10 248/917 |
| 9,854,695 | B1* | 12/2017 | Prabhakar | H05K 7/1487 |
| 10,340,673 | B2* | 7/2019 | Li | H02G 3/0437 |
| 2004/0211866 | A1* | 10/2004 | Jung | F16M 11/046 248/921 |
| 2005/0248912 | A1* | 11/2005 | Kang | F16M 13/02 361/679.57 |
| 2006/0203436 | A1* | 9/2006 | Hwang | F16M 11/2014 361/679.02 |
| 2007/0206124 | A1* | 9/2007 | Lee | H04N 9/3141 348/739 |
| 2010/0149734 | A1* | 6/2010 | Sakata | F16M 11/10 361/679.01 |
| 2012/0162949 | A1* | 6/2012 | Han | F16M 11/38 361/803 |
| 2022/0066516 | A1* | 3/2022 | Cho | G06F 1/1688 |
| 2022/0390984 | A1* | 12/2022 | Lee | G06F 1/1652 |

FOREIGN PATENT DOCUMENTS

| | | |
|---|---|---|
| KR | 101749302 | 6/2017 |
| KR | 101817715 | 1/2018 |
| KR | 1020180079566 | 7/2018 |

* cited by examiner

[FIG. 1]
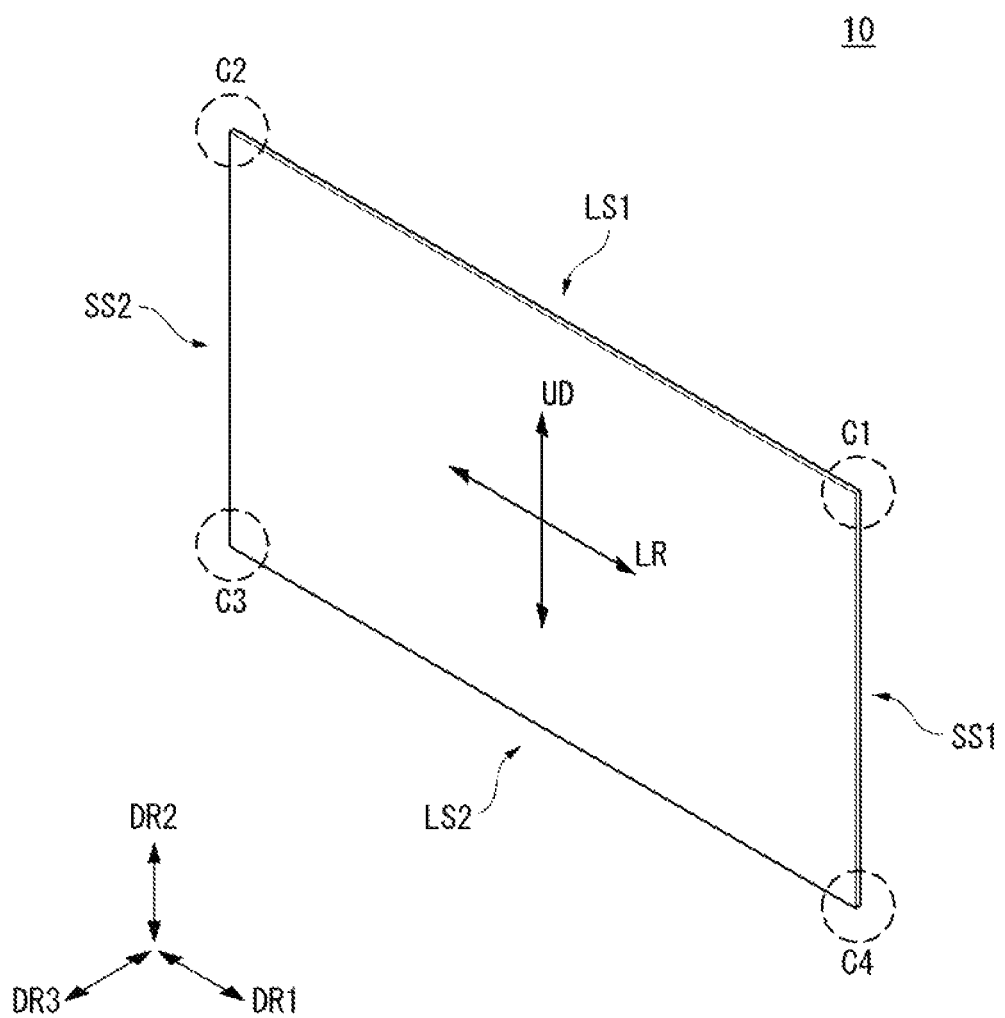

[FIG. 2]
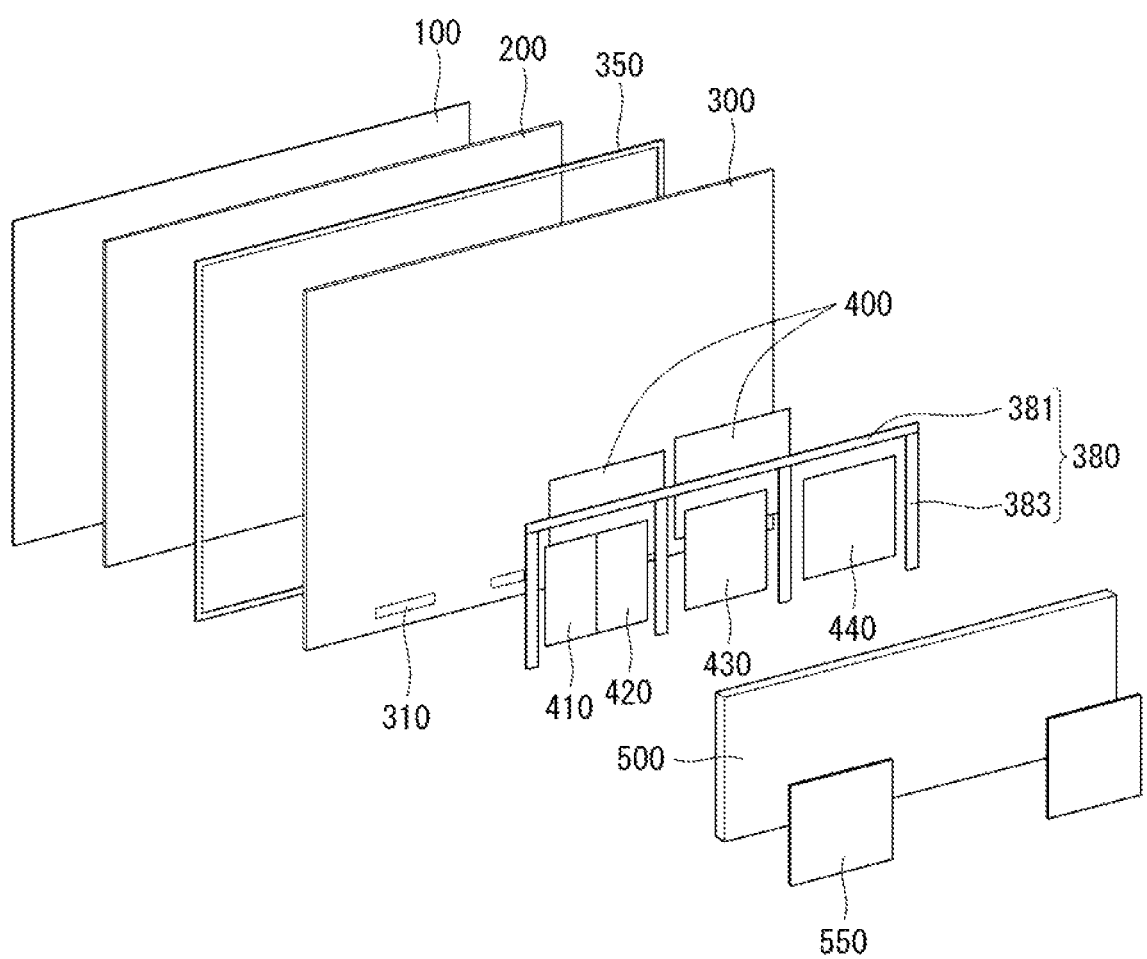

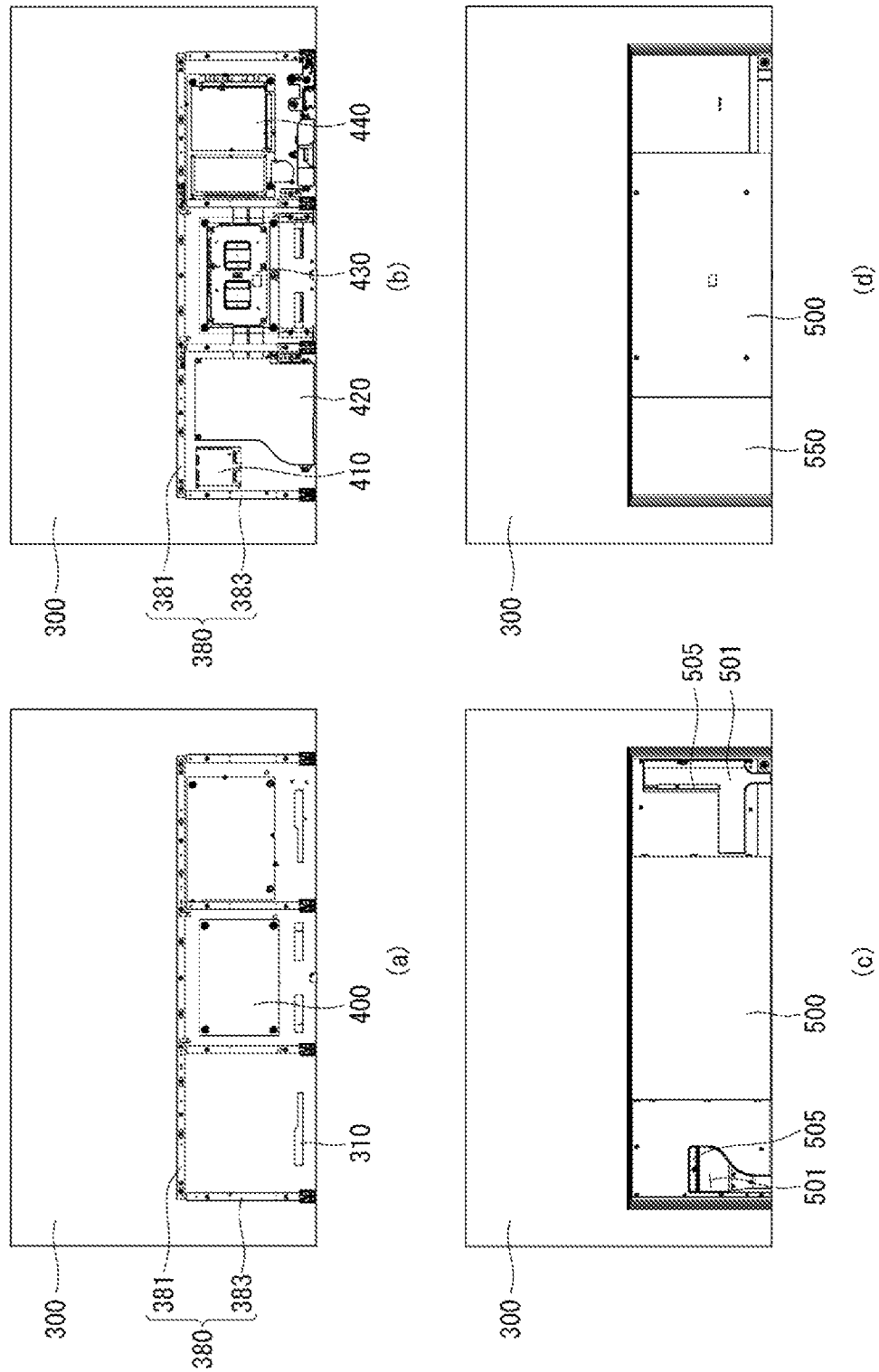
[FIG. 3]

[FIG. 4]
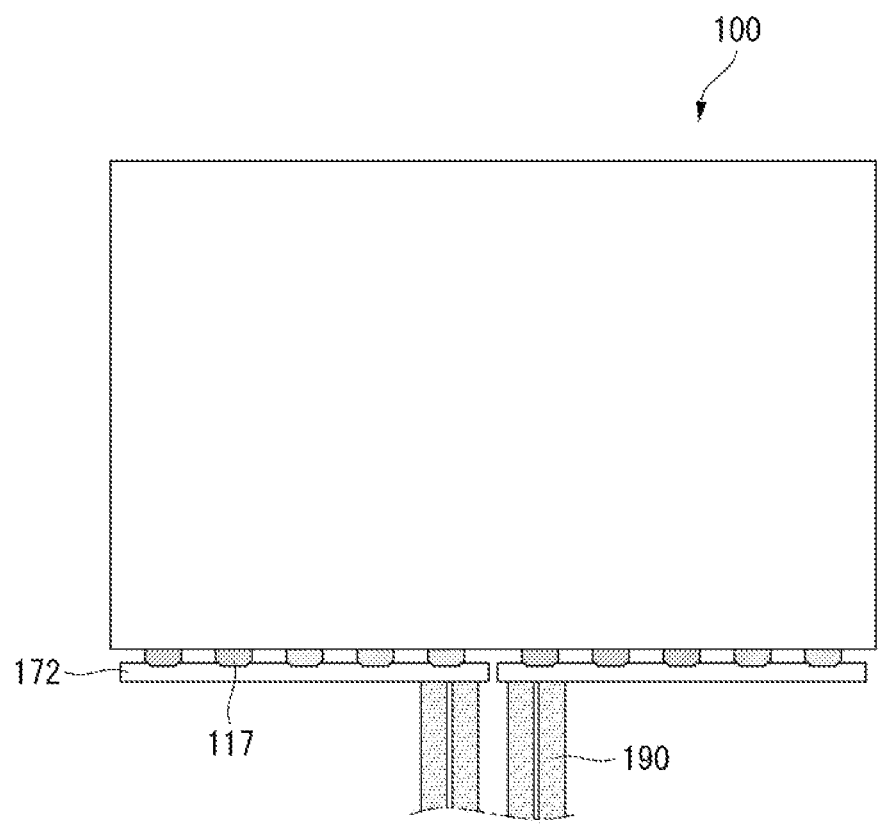

[FIG. 5]
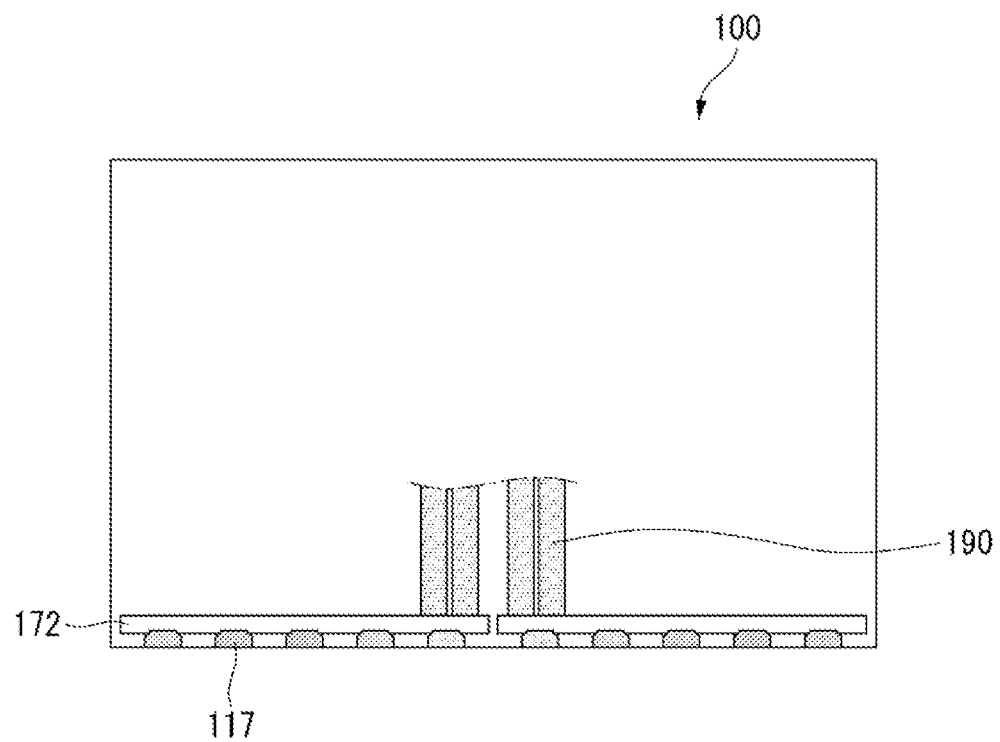

[FIG. 6]
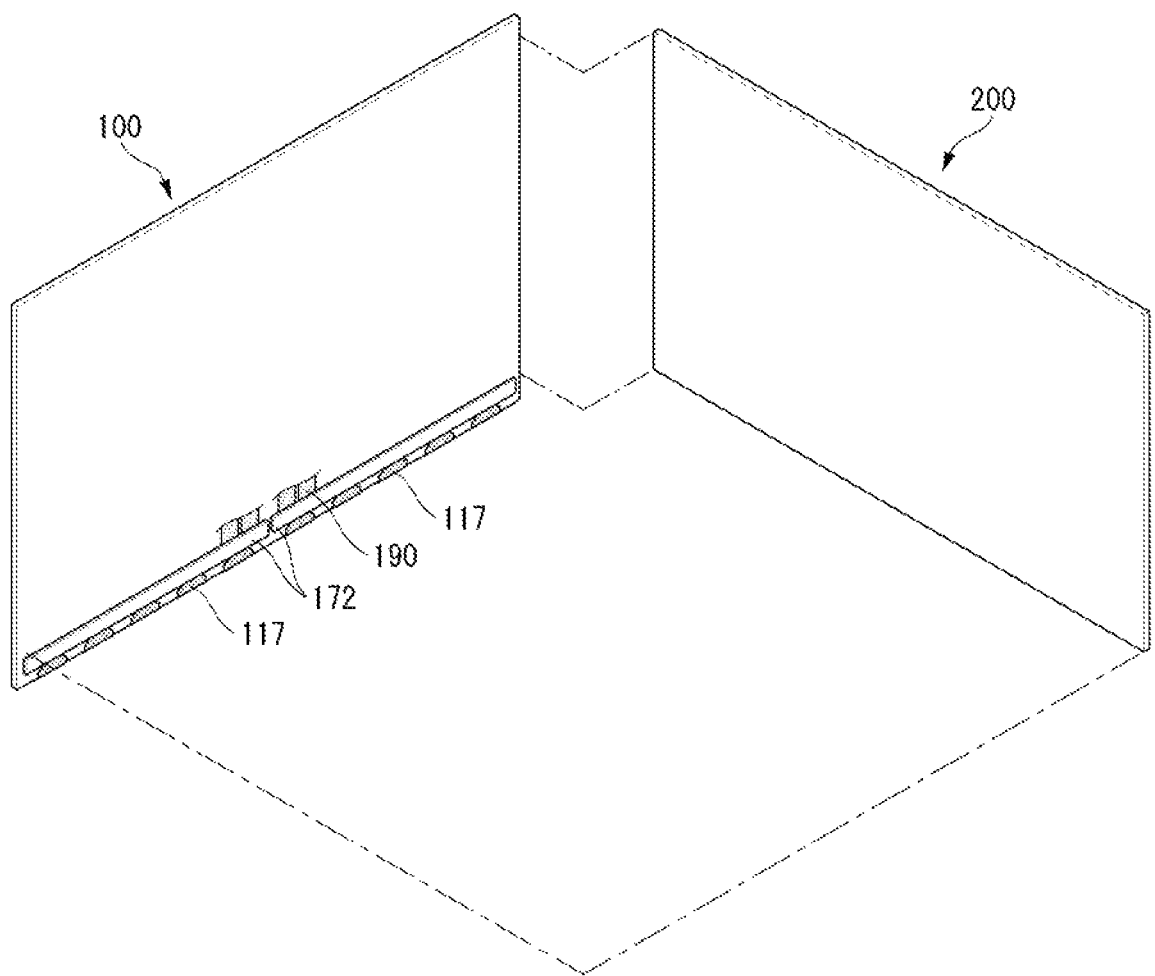

[FIG. 7]
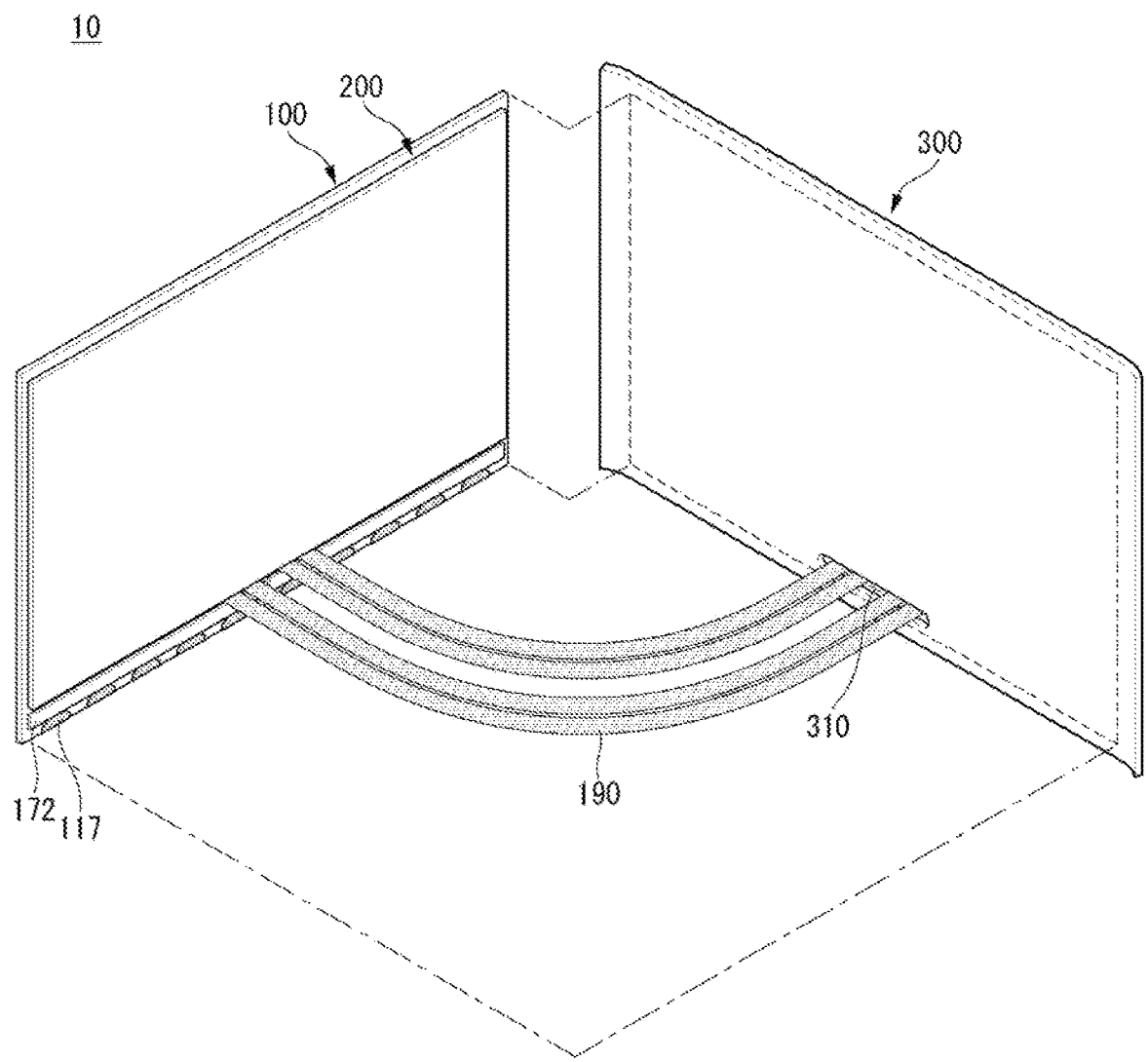

[FIG. 8]
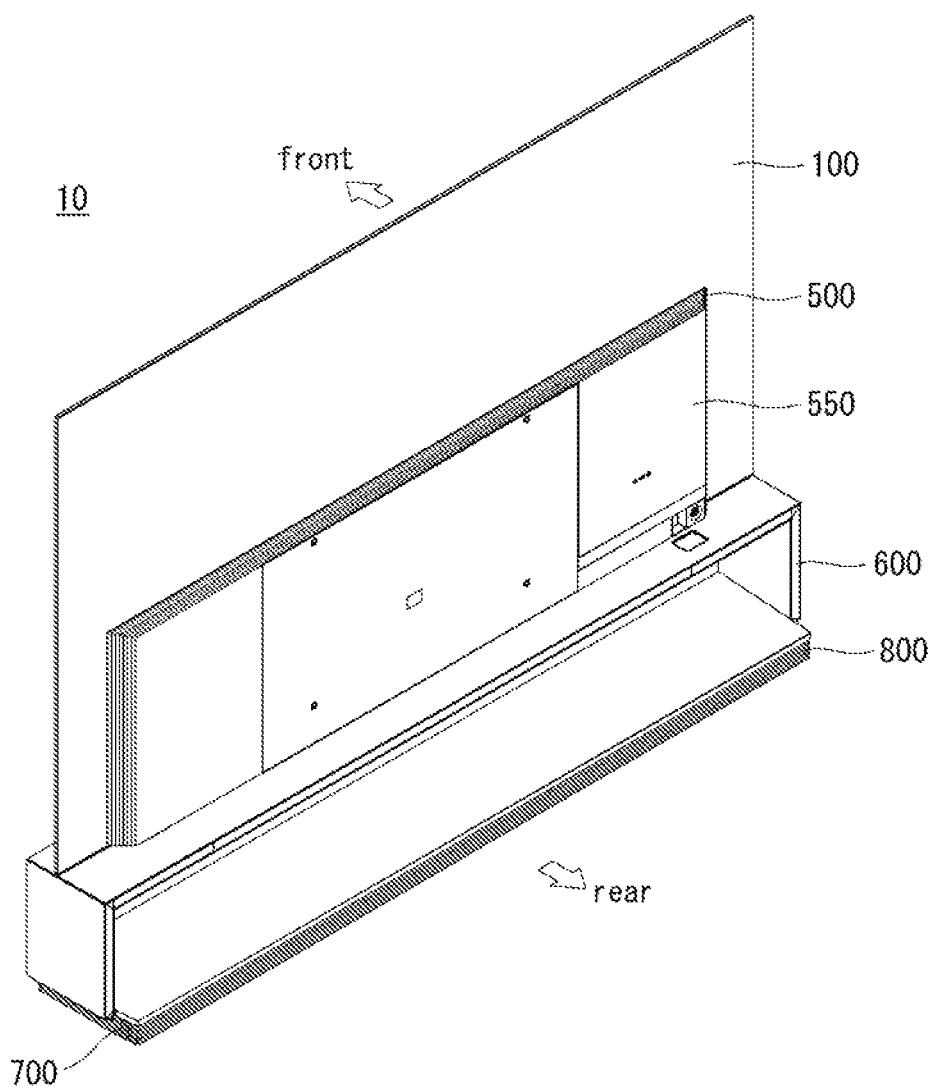

[FIG. 9]
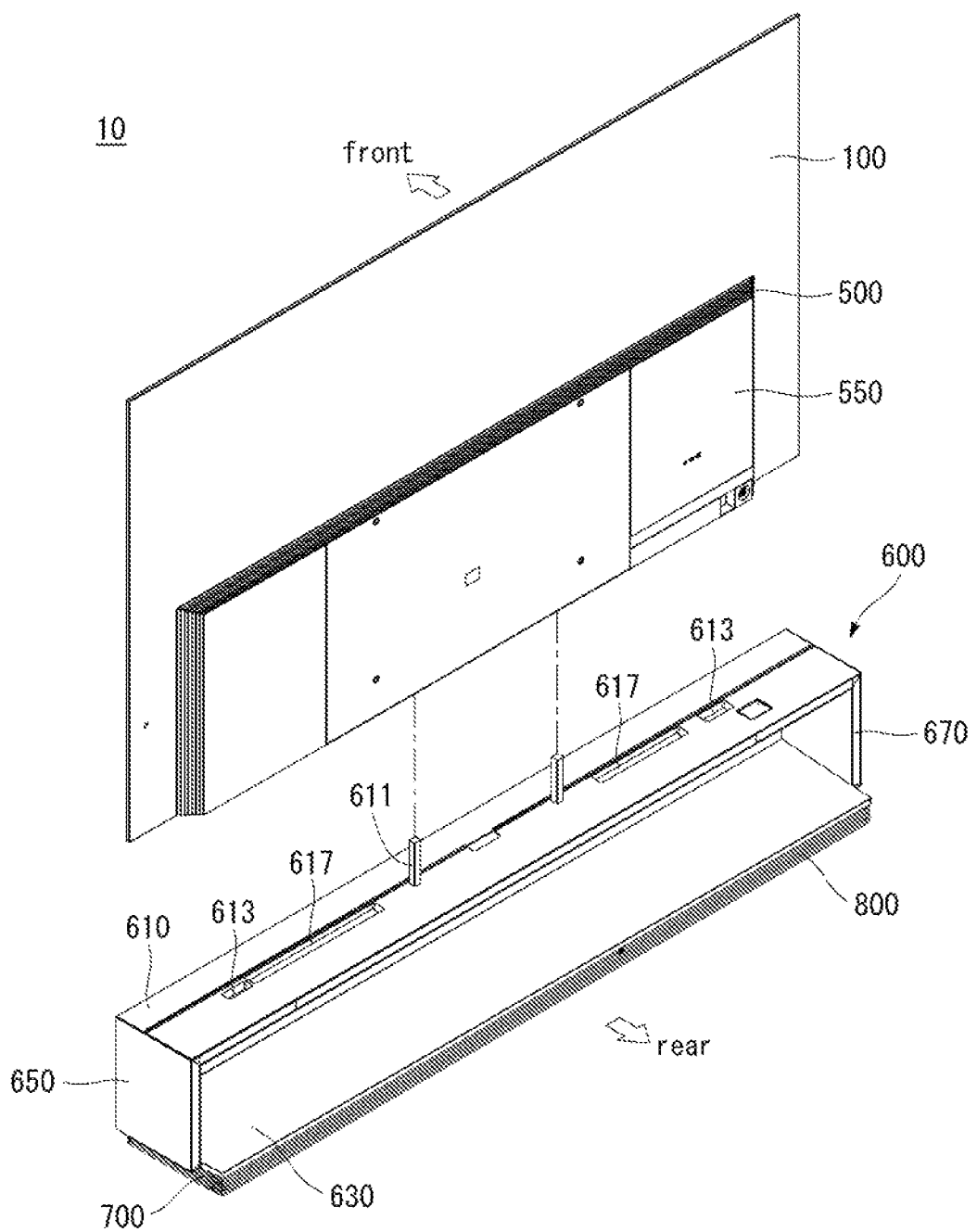

[FIG. 10]
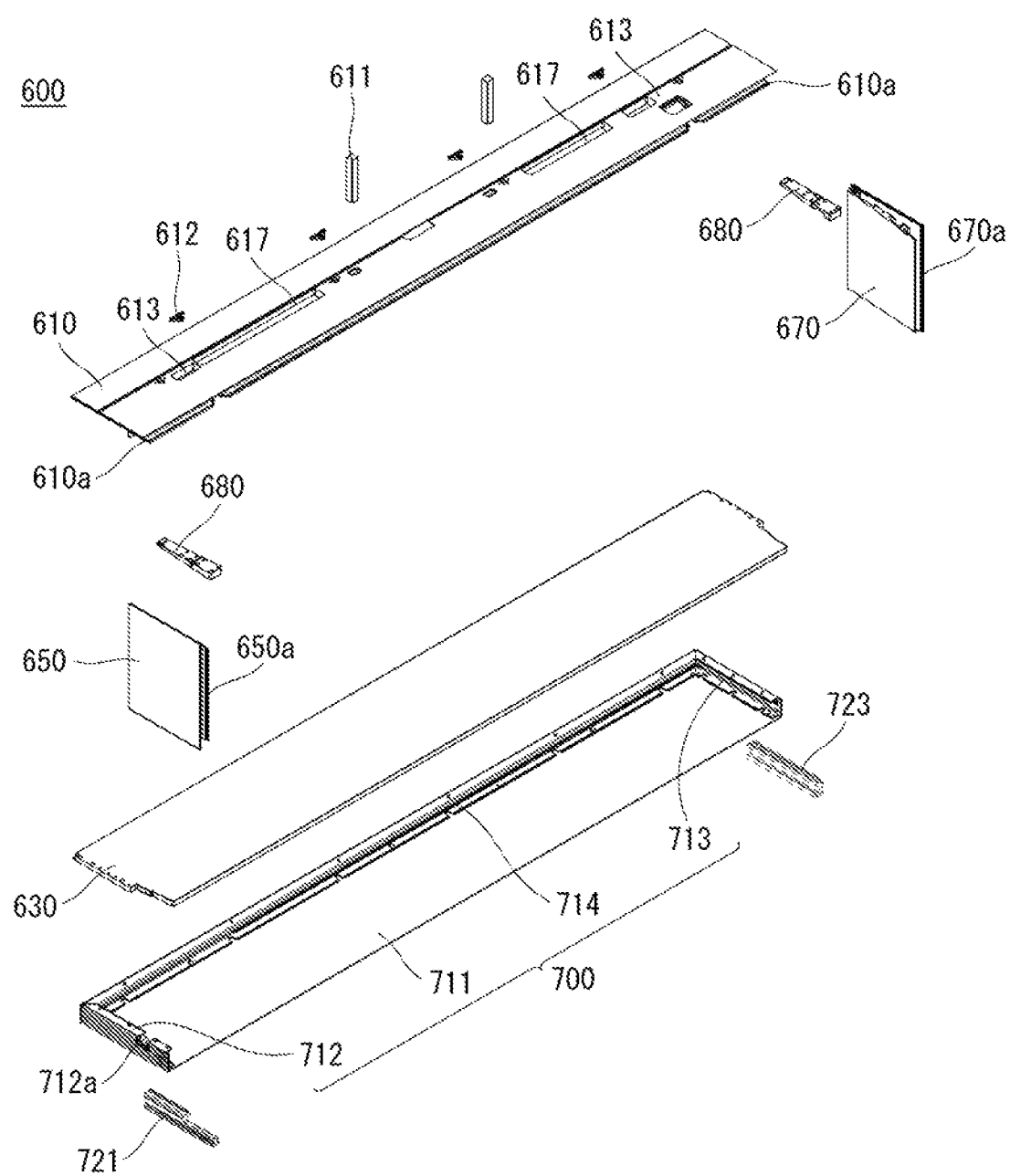

[FIG. 11]
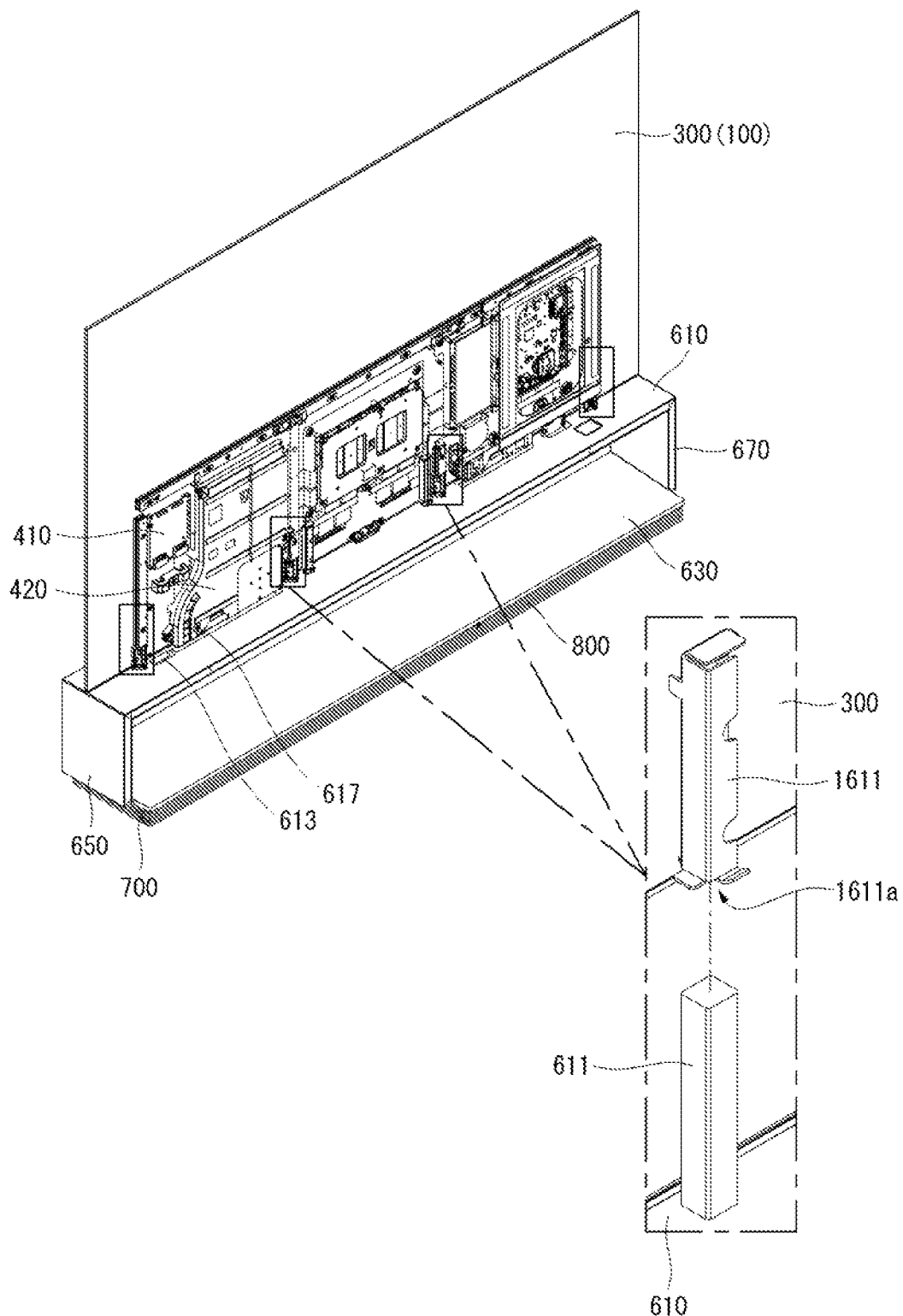

【FIG. 12】
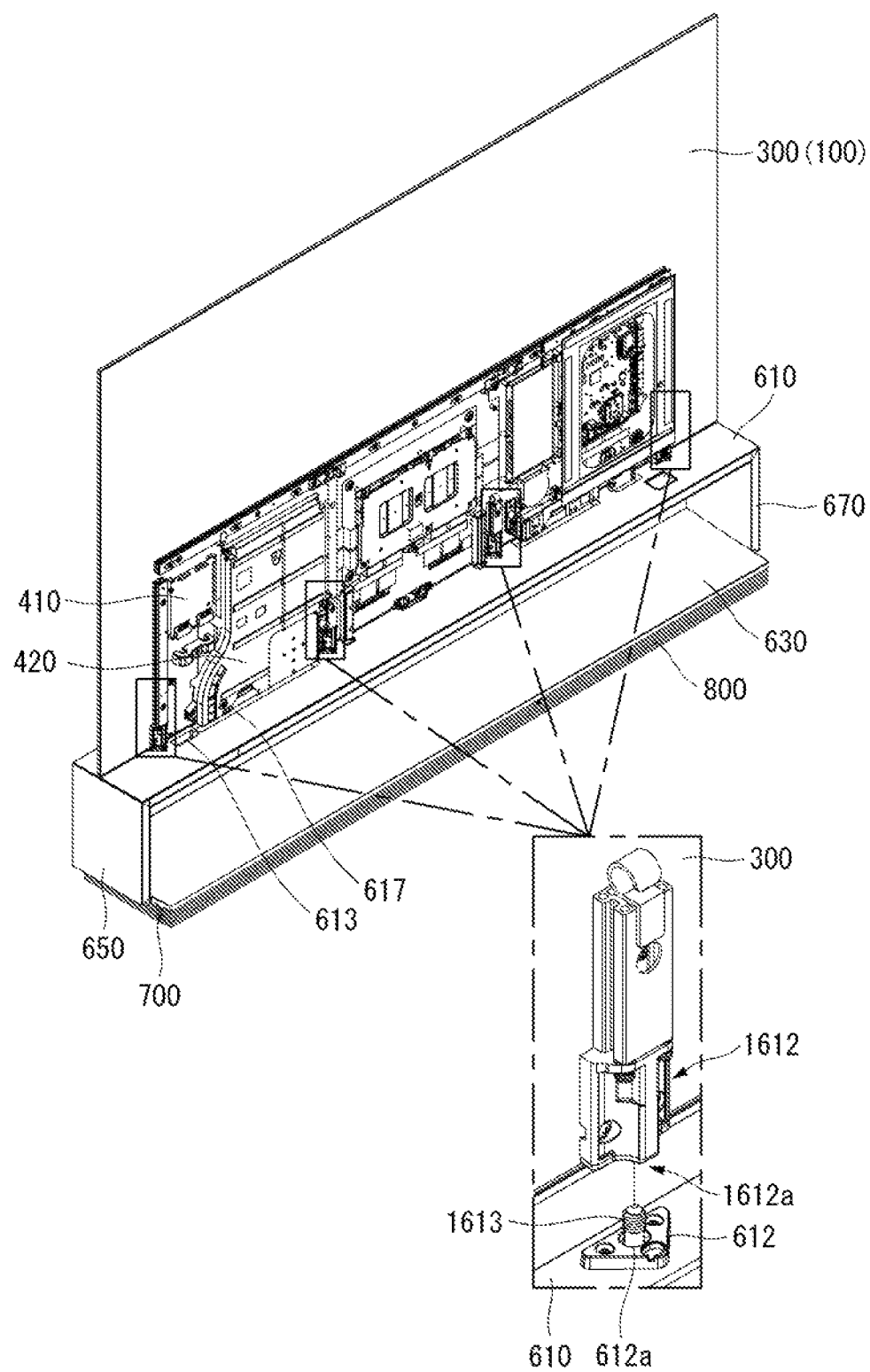

[FIG. 13]
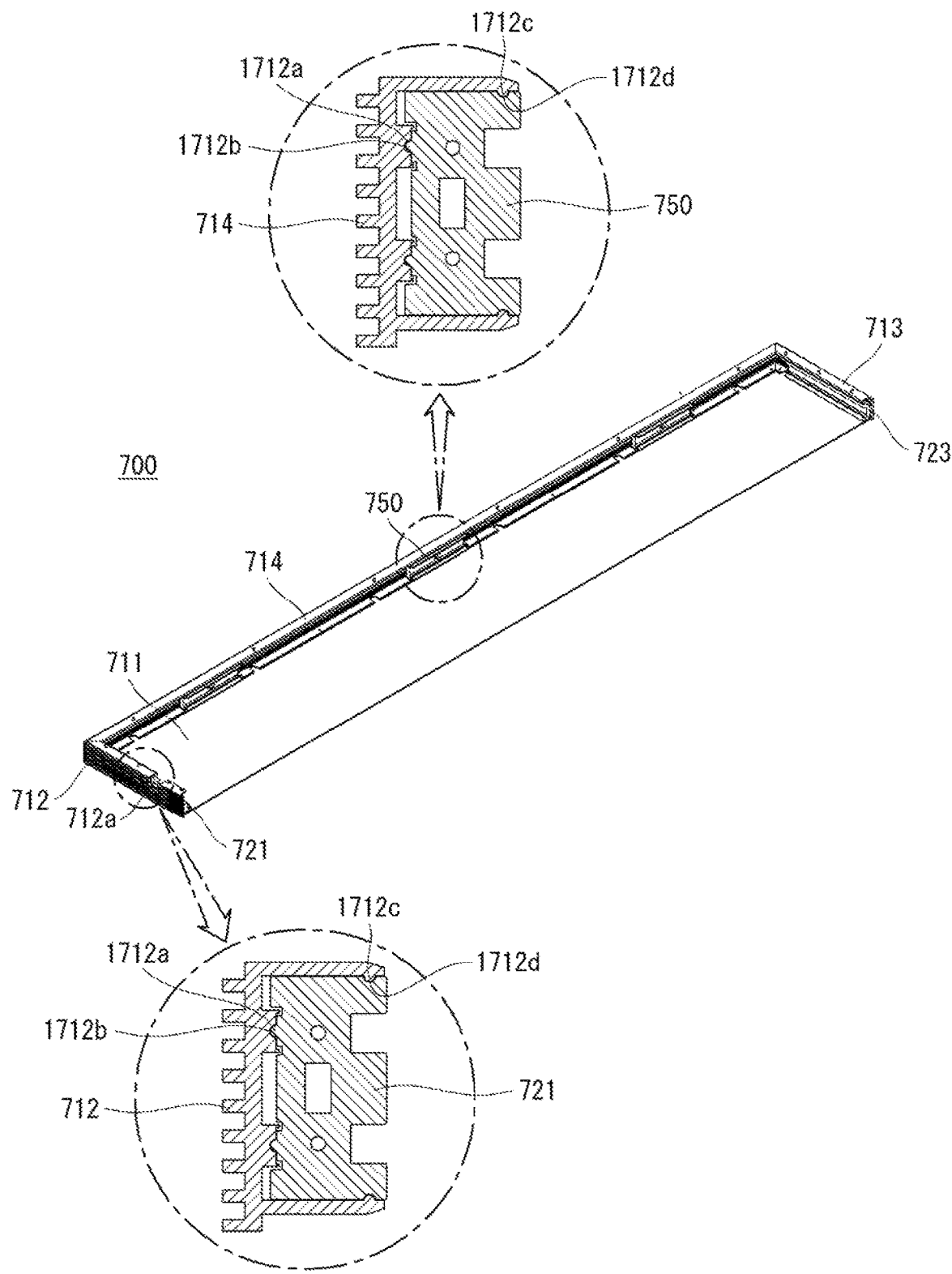

[FIG. 14]
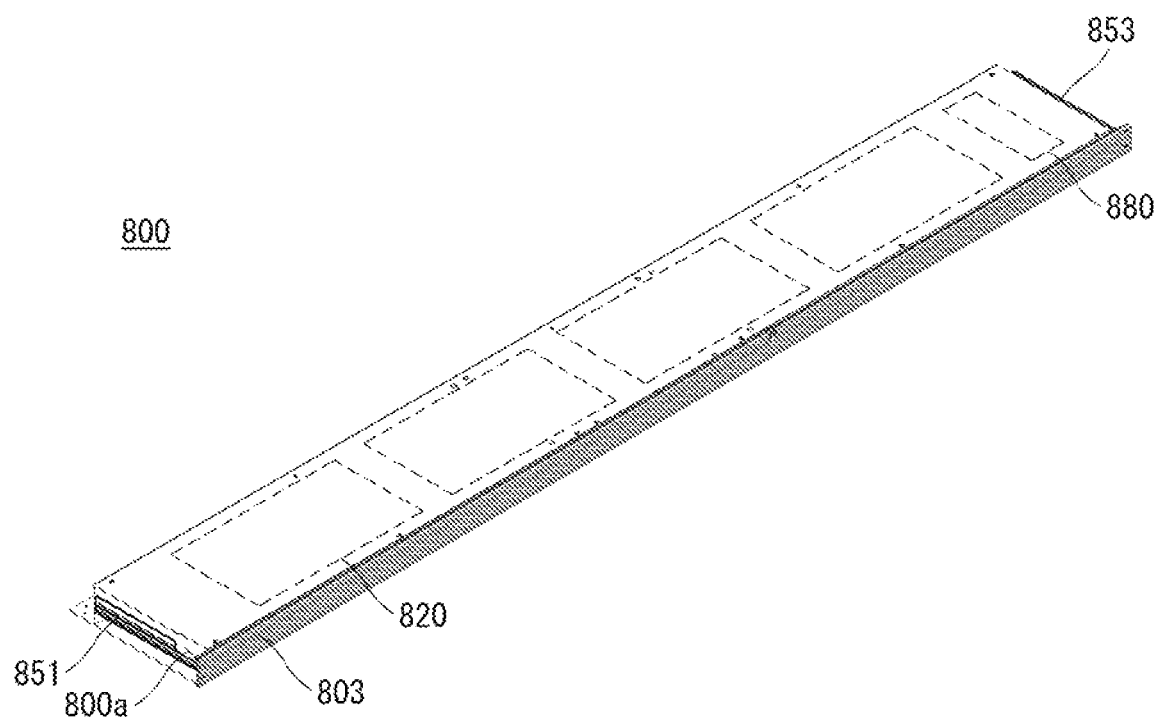

[FIG. 15]
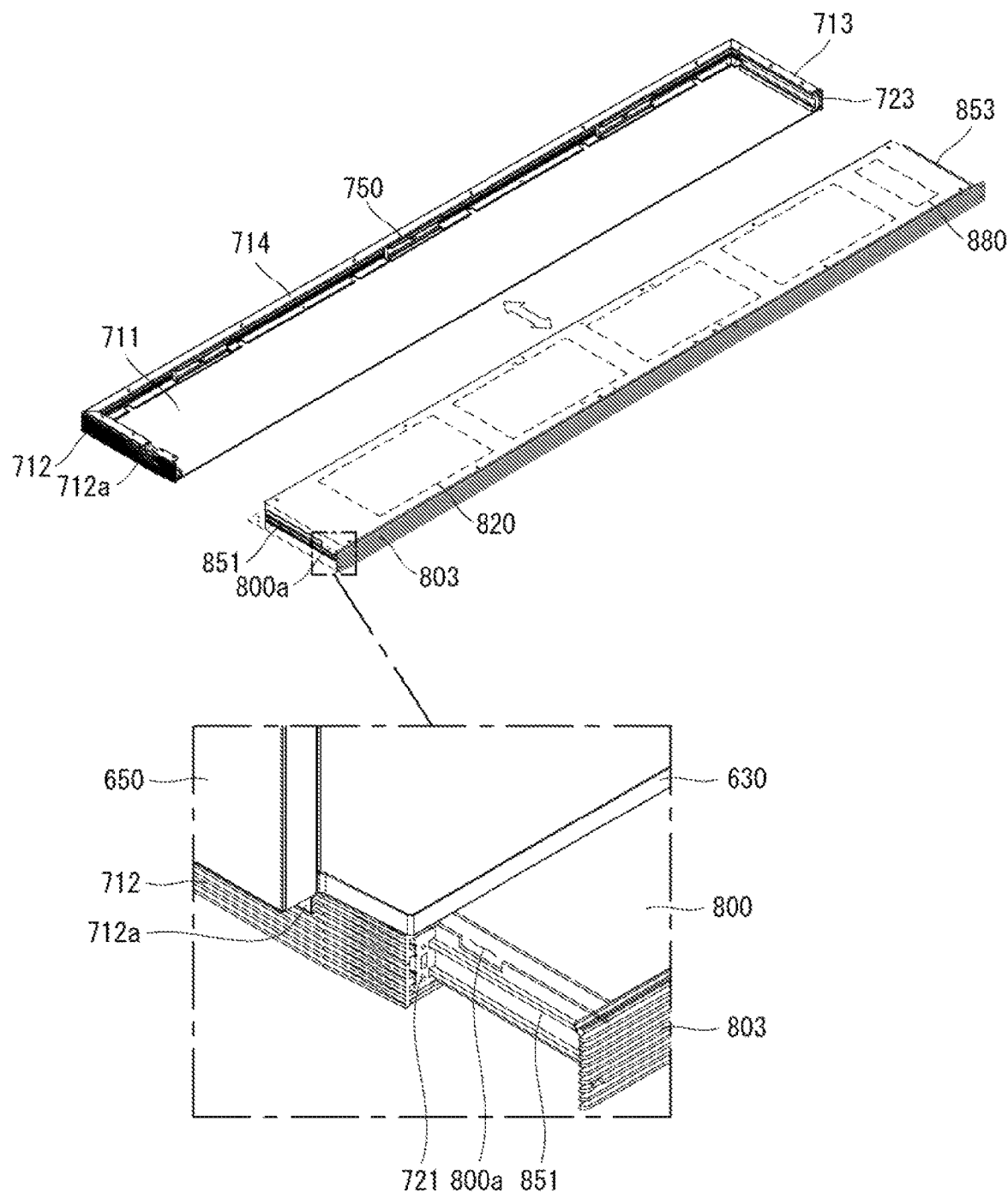

【FIG. 16】
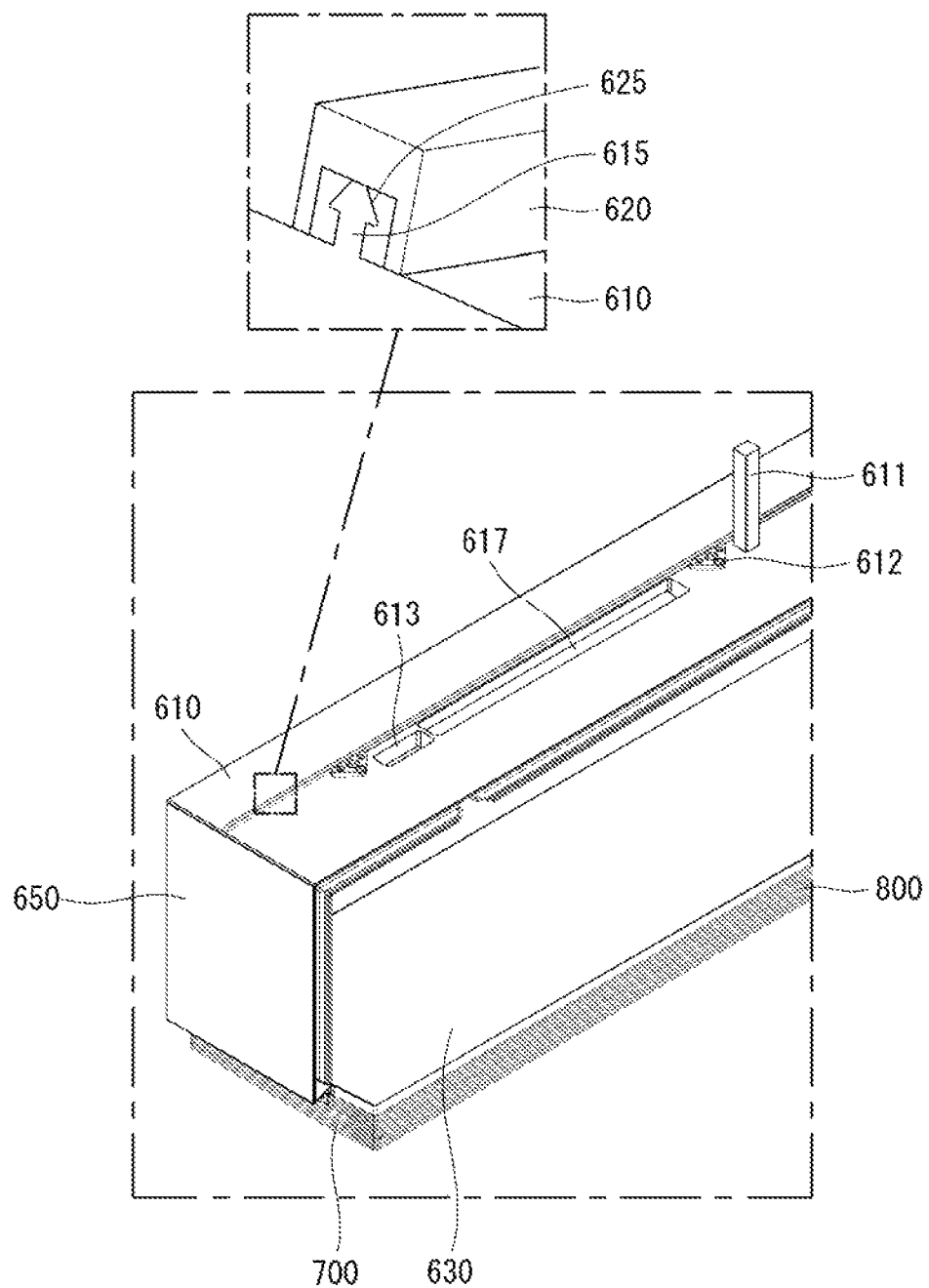

[FIG. 17]
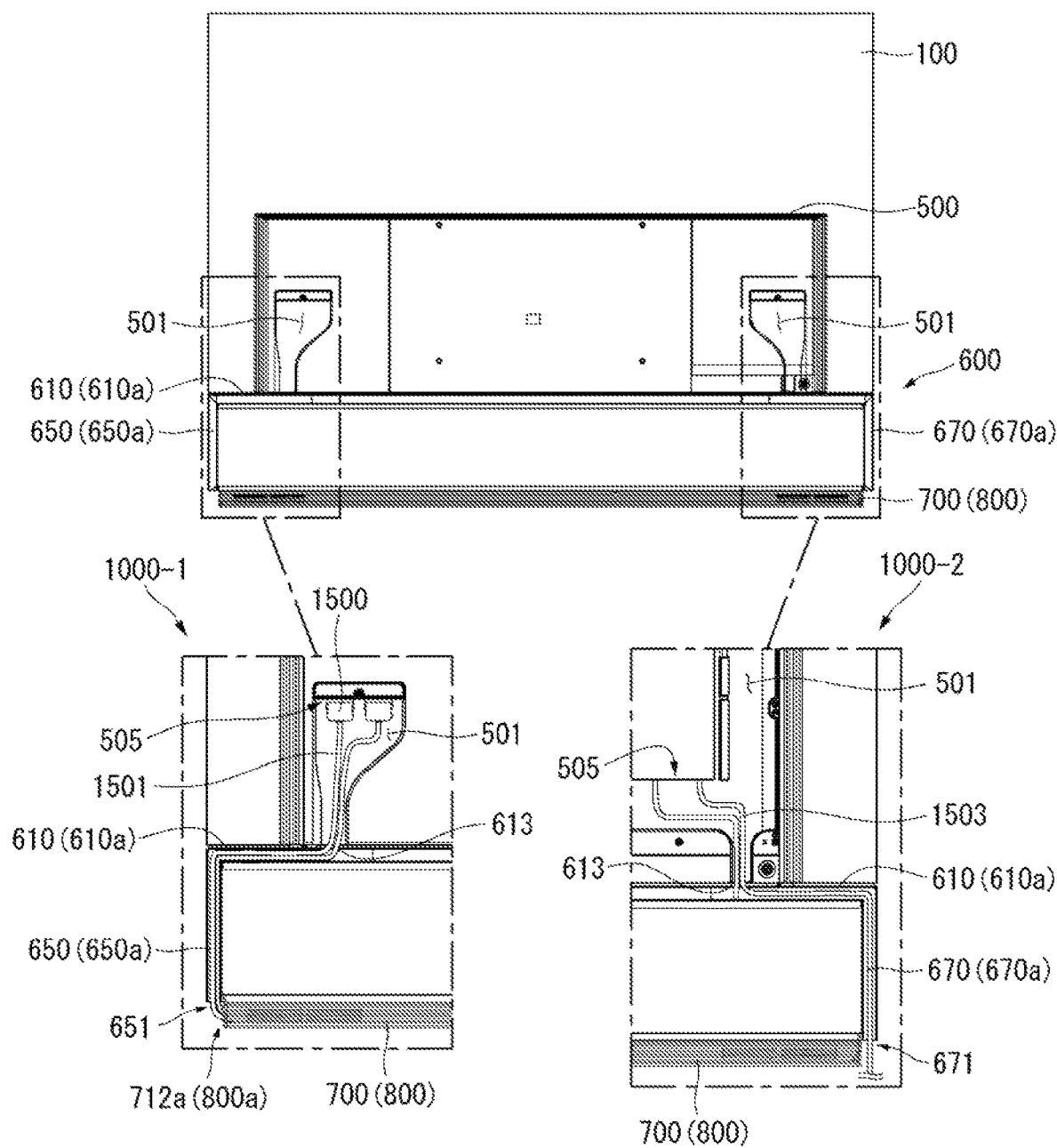

[FIG. 18]
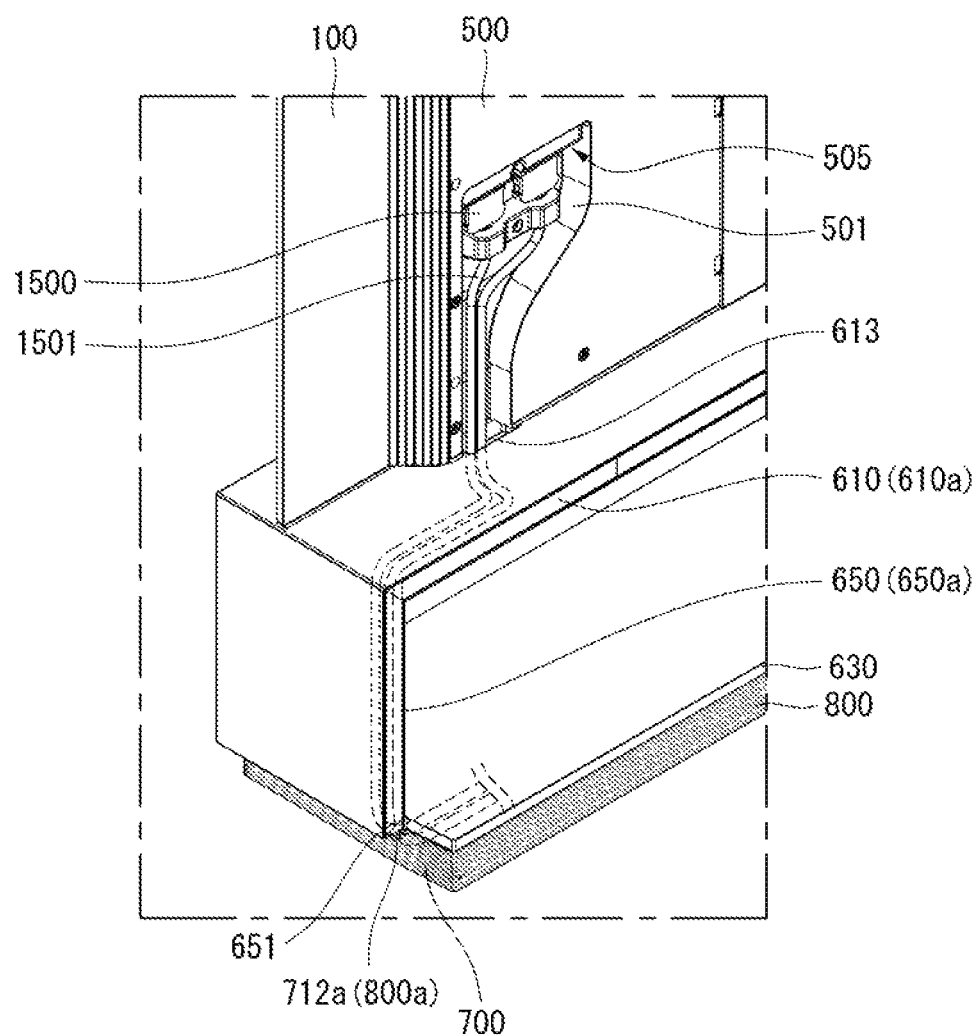

【FIG. 19】
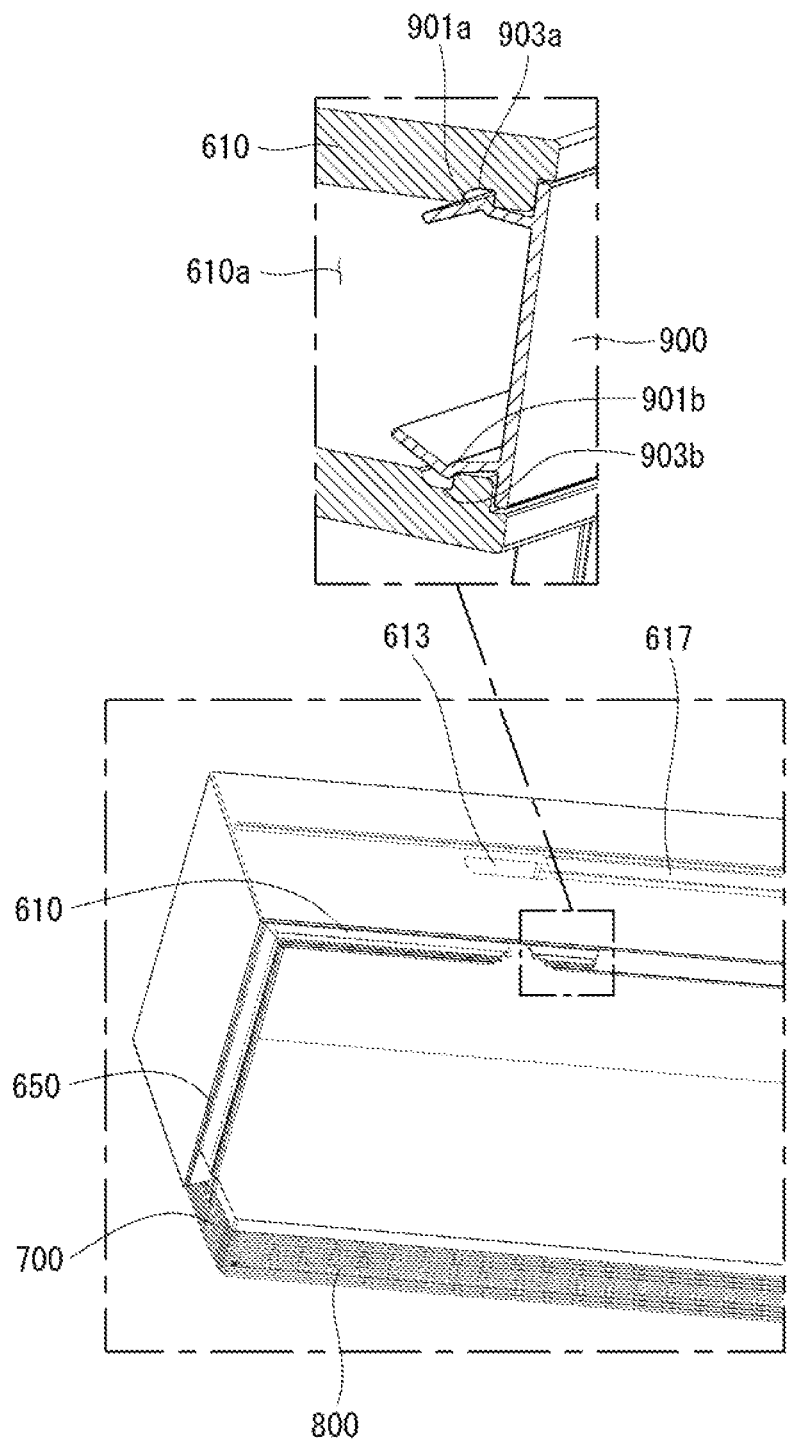

[FIG. 20]
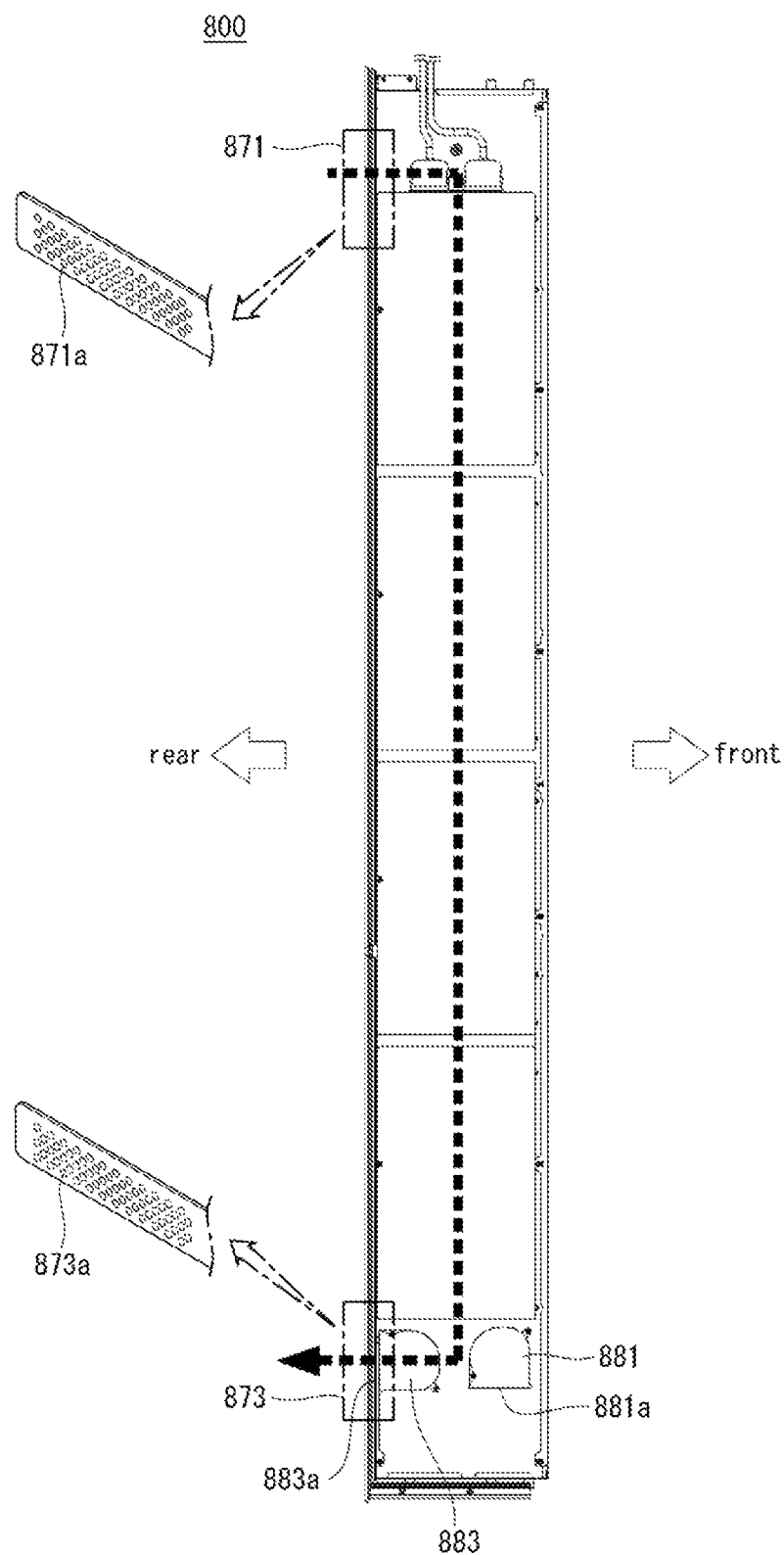

【FIG. 21】
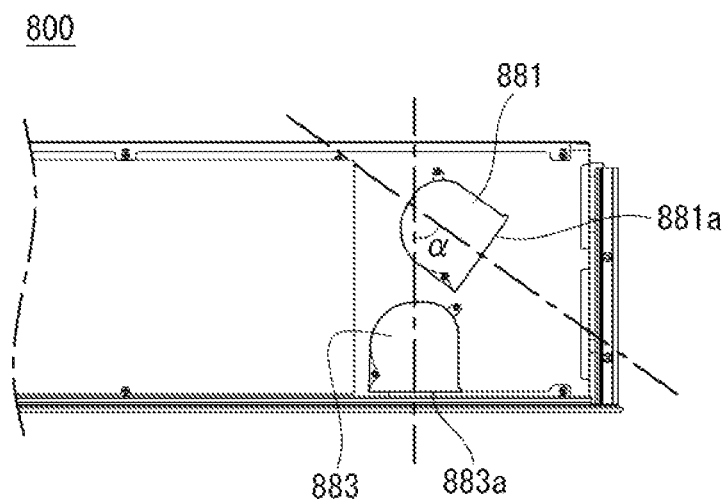
【FIG. 22】
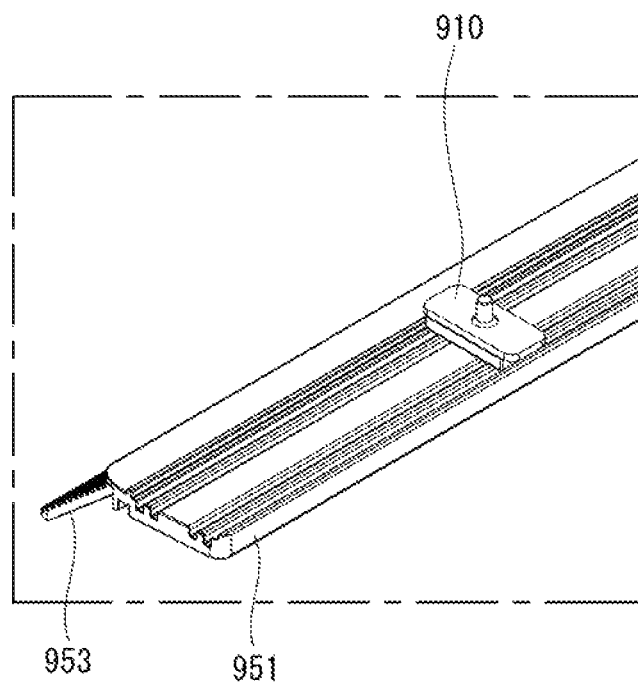

[FIG. 23]
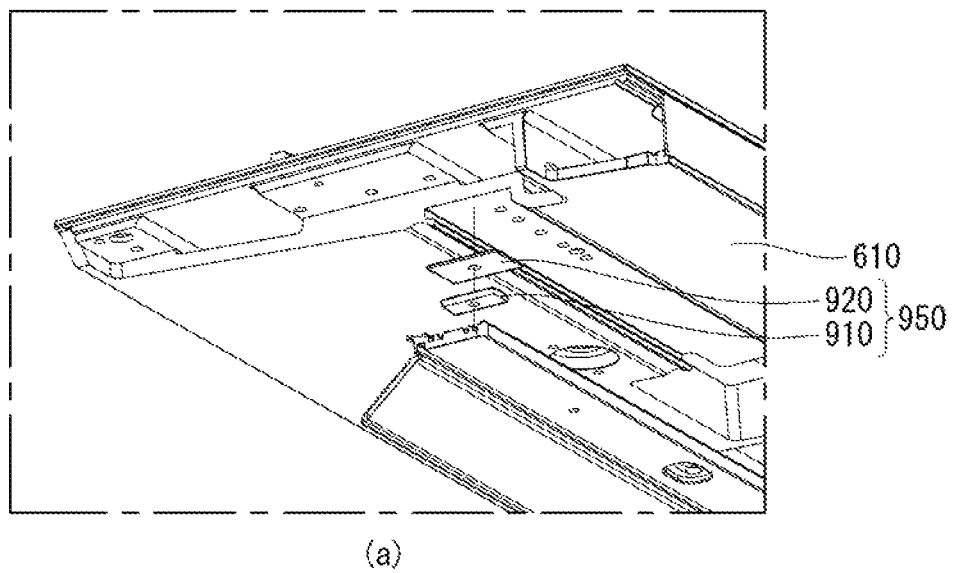
(a)
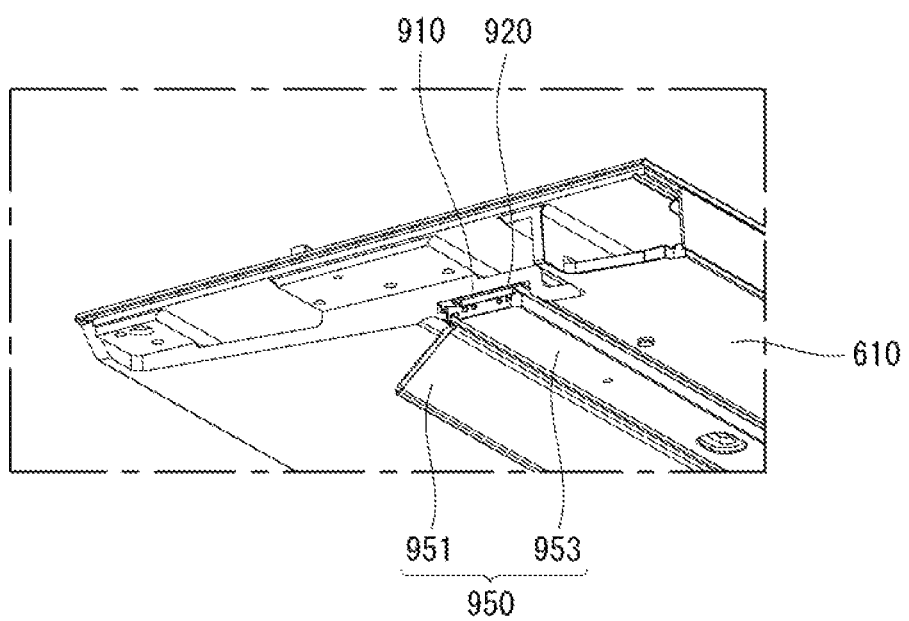
(b)

[FIG. 24]
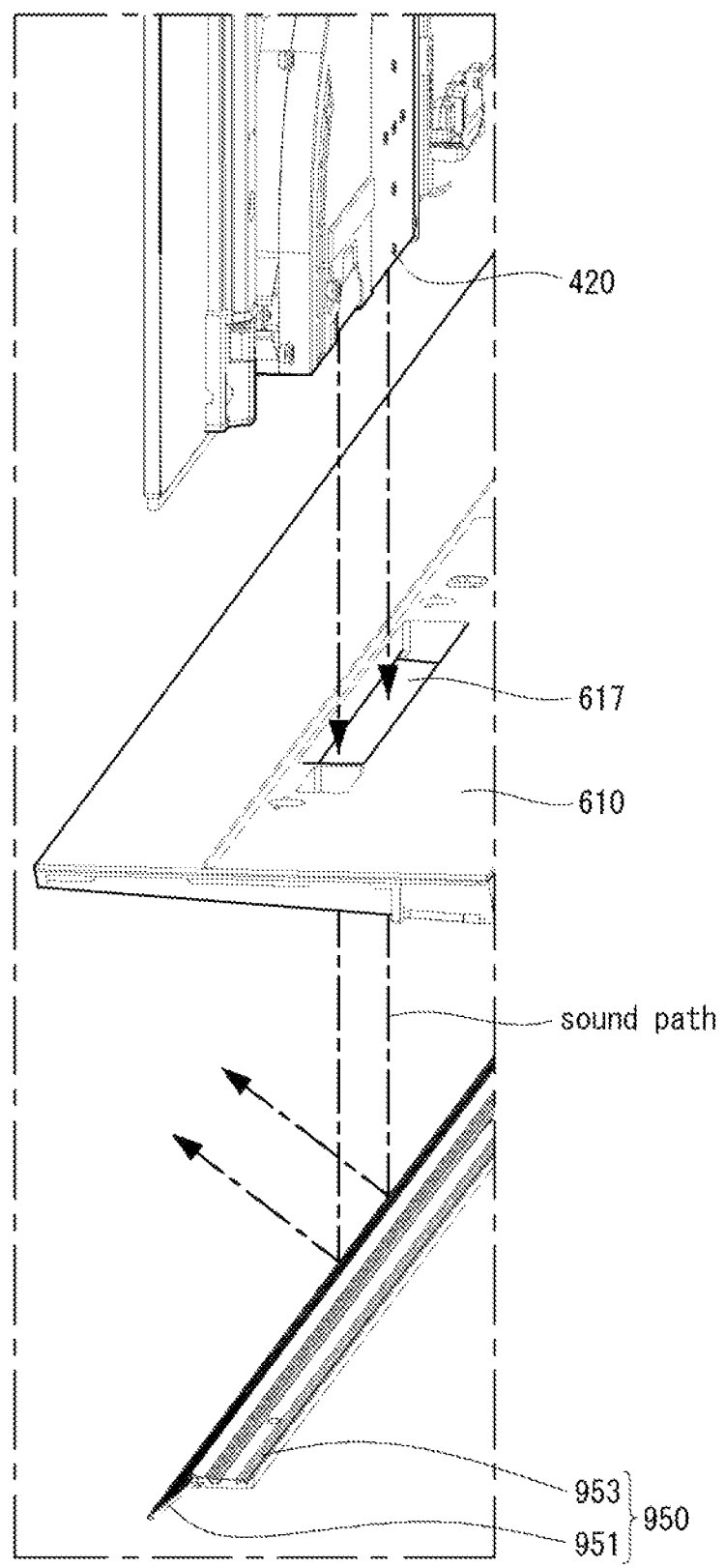

DISPLAY DEVICE

CROSS-REFERENCE TO RELATED APPLICATIONS

This application is the National Stage filing under 35 U.S.C. 371 of International Application No. PCT/KR2019/008358, filed on Jul. 8, 2019, which claims the benefit of earlier filing date and right of priority to Korean Patent Application No. 10-2019-0074975, filed on Jun. 24, 2019, the contents of which are all incorporated by reference herein in their entirety.

TECHNICAL FIELD

The present disclosure relates to a display device.

BACKGROUND ART

With the development of the information society, various types of demands for display devices are increasing. Various display devices such as a liquid crystal display (LCD), a plasma display panel (PDP), an electroluminescent display (ELD), and a vacuum fluorescent display (VFD) have been recently studied and used in response to the various types of demands.

Out of the various display devices, a display device using an organic light emitting diode (OLED) has better luminance characteristics and better viewing angle characteristics than the liquid crystal display and does not require a backlight unit, and thus can be implemented as a ultrathin profile.

DISCLOSURE

Technical Problem

An object of the present disclosure is to address the above-described and other problems. Another object of the present disclosure is to provide a stand capable of easily supporting a display panel coupled to a case member.

Another object of the present disclosure is to provide a display device in which a cable for applying electric power or signals to a display panel can be easily accommodated in a stand.

Another object of the present disclosure is to provide a display device including a dissipation mechanism capable of easily dissipating heat generated by components.

Another object of the present disclosure is to provide a display device capable of providing a sound with good quality by providing a sound reflector capable of changing a path of sound provided by a speaker.

Technical Solution

To achieve the above-described and other objects, in one aspect of the present disclosure, there is provided a display device comprising a display panel; a frame disposed behind the display panel and coupled to the display panel; a stand configured to support the frame at a lower part of the display panel; a bottom accommodation portion fixed to a lower part of the stand, the bottom accommodation portion having an inner space that is opened rearward; and a box slidably inserted into the inner space, the box having an accommodation space provided inside the box.

According to another aspect of the present disclosure, the display device may further comprise sliders fixed to outsides of both ends of the box; and guide rails fixed to insides of both ends of the bottom accommodation portion and configured to guide the sliders to slide forward or rearward.

According to another aspect of the present disclosure, the stand may comprise a top plate; a bottom plate disposed opposite the top plate below the top plate and spaced apart from the top plate; a first side plate configured to connect the top plate to the bottom plate at one side of the top plate and the bottom plate; and a second side plate configured to connect the top plate to the bottom plate at other side of the top plate and the bottom plate, the second side plate being opposite to the first side plate. The bottom accommodation portion may be coupled to a lower part of the bottom plate.

According to another aspect of the present disclosure, the bottom accommodation portion may comprise a bottom body disposed opposite the bottom plate below the bottom plate; a first side body configured to connect the bottom body to the bottom plate at one side; a second side body configured to connect the bottom body to the bottom plate at other side; and a third side body configured to connect the bottom body to the bottom plate at a front surface. The first and second side bodies may be formed in a "⊏"-shape and may accommodate the guide rails.

According to another aspect of the present disclosure, a support member may comprise a first convex portion and a first concave portion. The first and second side bodies may comprise a second concave portion into which the first convex portion is inserted, and a second convex portion inserted into the first concave portion. One of the first convex portion and the first concave portion may be formed on an upper surface and a lower surface of the support member, and the other of the first convex portion and the first concave portion may be formed on a side surface of the support member.

According to another aspect of the present disclosure, the display device may further comprise a support member provided in the bottom accommodation portion. The third side body may be formed in a "⊏"-shape and may accommodates the support member.

According to another aspect of the present disclosure, the top plate may comprise a top accommodation portion having a predetermined inner space that is opened rearward; and a top hole configured to open at least a part of the top accommodation portion toward the display panel. At least one of the first and second side plates may comprise a side accommodation portion having a predetermined inner space, that is opened rearward, and communicating with the top accommodation portion. The bottom accommodation portion may communicate with the side accommodation portion, and the body may communicate with the bottom accommodation portion.

According to another aspect of the present disclosure, the display device may further comprise an electronic component disposed behind the frame and configured to transmit a predetermined electric power or signal to the display panel; a back cover disposed behind the frame and configured to accommodate the electronic component; a component accommodated in the body; and a cable configured to electrically connect the electronic component to the component. The cable may pass through the top hole and may be accommodated in the top accommodation portion, the side accommodation portion, the bottom accommodation portion, and the body.

According to another aspect of the present disclosure, the display device may further comprise a fan provided in the box. The box may comprise an air inlet comprising inlet slits that are opened rearward at one side; and an air outlet comprising outlet slits that are opened rearward at other side. The fan may be disposed adjacent to the air outlet.

According to another aspect of the present disclosure, the fan may comprise a first fan having a first discharge direction; and a second fan disposed closer to the air outlet than the first fan and having a second discharge direction. The first discharge direction may be different from the second discharge direction.

According to another aspect of the present disclosure, the second discharge direction may be directed toward the outlet slits. The first discharge direction may be directed toward a direction tilted by a predetermined angle from the second discharge direction. The predetermined angle may be an acute angle or a right angle.

Advantageous Effects

According to at least one aspect of the present disclosure, the present disclosure can prevent defects due to deformation by providing a stand that can easily support a display panel coupled to a case member.

According to at least one aspect of the present disclosure, the present disclosure can easily accommodate, in a stand, a cable for applying electric power or signals to a display panel.

According to at least one aspect of the present disclosure, the present disclosure can minimize a damage of components caused by heat by having a heat dissipation mechanism capable of easily dissipating heat generated by the components.

According to at least one aspect of the present disclosure, the present disclosure can provide a sound with good quality by comprising a sound reflector capable of changing a path of sound provided by a speaker.

DESCRIPTION OF DRAWINGS

FIGS. 1 and 2 illustrate a display device according to an embodiment of the present disclosure.

FIG. 3 illustrates a process of coupling a display panel and a case member according to an embodiment of the present disclosure.

FIGS. 4 to 7 illustrate a connection relationship between a display panel and a cable and a position relationship between a cable and a case member according to an embodiment of the present disclosure.

FIGS. 8 to 16 illustrate detailed configuration of a display device according to an embodiment of the present disclosure.

FIGS. 17 to 19 illustrate a cable compartment included in a stand according to an embodiment of the present disclosure.

FIGS. 20 and 21 illustrate a heat dissipation structure according to an embodiment of the present disclosure.

FIGS. 22 to 24 illustrate a sound reflector according to an embodiment of the present disclosure.

MODE FOR INVENTION

Reference will now be made in detail to embodiments of the disclosure, examples of which are illustrated in the accompanying drawings. Wherever possible, the same reference numbers will be used throughout the drawings to refer to the same or like parts.

In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, embodiments of the present disclosure are described using an organic light emitting diode panel (hereinafter, 'OLED panel') as an example of a display panel. However, embodiments of the present disclosure are not limited thereto.

FIGS. 1 and 2 illustrate a display device according to an embodiment of the present disclosure. FIG. 3 illustrates a process of coupling a display panel and a case member according to an embodiment of the present disclosure.

Referring to FIGS. 1 and 2, a display panel 100 of a display device 10 may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

Embodiments of the present disclosure illustrate and describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel 100, and a second direction DR2 may be a direction parallel to the short sides SS1 and SS2 of the display panel 100.

The first direction DR1 may be parallel to a horizontal axis. The first direction DR1 may be referred to as a first horizontal axis. The second direction DR2 may be parallel to a vertical axis. The second direction DR2 may be referred to as the vertical axis. A third direction DR3 may be parallel to the horizontal axis. The third direction DR3 may be referred to as a second horizontal axis.

A side of the display panel 100 on which an image is displayed may be referred to as a forward direction or a front surface. When the display panel 100 displays an image, a side of the display panel 100 at which the image cannot be observed may be referred to as a rearward direction or a rear surface. The third direction DR3 may be a back-and-forth direction.

When the display device 10 is viewed from the forward direction or the front surface, the first long side LS1 may be referred to as an upper side or an upper surface. In the same manner, the second long side LS2 may be referred to as a lower side or a lower surface. In the same manner, the first short side SS1 may be referred to as a right side or a right surface, and the second short side SS2 may be referred to as a left side or a left surface.

A lateral side of the display device 10 may indicate at least one of the upper surface, the lower surface, the right surface, and the left surface of the display device 10.

Further, the first long side LS1, the second long side LS2, the first short side SS1, and the second short side SS2 may be referred to as edges of the display device 10. Positions where the first long side LS1, the second long side LS2, the first short side SS1, and the second short side SS2 meet each other may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Referring to FIGS. 2 and 3, the display panel 100 may be provided on the front surface of the display device 10 and may display an image. The display panel 100 may divide the image into a plurality of pixels and adjust hue, brightness, and saturation for each pixel to output the image. The display panel 100 may be divided into an active area in which the image is displayed, and an inactive area in which the image is not displayed.

The display panel 100 may include an OLED panel. The display panel 100 may emit light by itself. The display panel 100 may have a very thin thickness.

An inner plate 200 may be disposed behind the display panel 100. The inner plate 200 may be attached to a rear surface of the display panel 100. The inner plate 200 may be smaller than the display panel 100. The inner plate 200 may be coupled to the rear surface of the display panel 100 by a double-sided adhesive tape or a magnet. The inner plate 200 may include a ferromagnetic material or a paramagnetic material.

The inner plate 200 may provide rigidity to the display panel 100. The inner plate 200 may receive heat from the display panel 100 and emit the heat. The inner plate 200 may have high heat conductivity. The inner plate 200 may include metal. For example, the inner plate 200 may include aluminum or aluminum alloy.

A frame 300 may be disposed behind the inner plate 200. The frame 300 may provide an inner space. The frame 300 may accommodate the inner plate 200 and the display panel 100. The inner plate 200 and the display panel 100 may be disposed in the inner space formed in the frame 300. If necessary, the frame 300 may cover at least a part of the side surface of the inner plate 200 and the display panel 100.

The frame 300 may include a fiber to reinforce rigidity. For example, the frame 300 may include at least one of a glass fiber, a carbon fiber, a metallic wire, and a metallic fiber. The frame 300 may include a microfiber.

A middle cabinet 350 may be disposed to surround an edge of the display panel 100. The middle cabinet 350 may have a frame shape in which the center is penetrated so as to surround an outer edge of the display panel 100. The middle cabinet 350 may support the edge of the display panel 100 behind the display panel 100. The frame 300 may be seated on a rear surface of the middle cabinet 350 and fixed to the middle cabinet 350.

The middle cabinet 350 may be formed of a synthetic resin, such as plastic, or a metal material. However, it may be preferable that the middle cabinet 350 is formed of aluminum or aluminum alloy or stainless steel or a galvanized steel sheet in consideration of a predetermined strength and heat dissipation.

A rigid bar 380 may be disposed behind the frame 300. The rigid bar 380 may be in contact with a rear surface of the frame 300. The rigid bar 380 may provide rigidity to the frame 300 and/or the display panel 100. That is, the rigid bar 380 may be branched in multiple directions, and may prevent bending deformation of the frame 300 or the like. The rigid bar 380 may be formed of a material such as carbon fiber reinforced plastics (CFRP), but is not limited thereto.

For example, the rigid bar 380 may include a first body 381 extending in the left-right direction of the display panel 100, and a second body 383 extending in the vertical direction, for example, in the up-down direction from the first body 381. The first body 381 and the second body 383 may be formed as one body. That is, the second body 383 may be a portion branched from the first body 381. Alternatively, the first body 381 and the second body 383 may be formed as separate bodies. The neighboring second bodies 383 may be positioned to be spaced apart from each other by a predetermined distance. As will be described later, each electronic component may be disposed between the neighboring second bodies 383. Each of the first body 381 and the second body 383 may include a plurality of bodies.

A PCB plate 400 may be disposed behind the frame 300. The PCB plate 400 may be coupled to the rear surface of the frame 300. The PCB plate 400 may be coupled to the frame 300. The PCB plate 400 may be divided into a plurality of parts, and each PCB plate 400 may be disposed between the neighboring second bodies 383.

A rear surface of the PCB plate 400 may accommodate electronic components. For example, a power distributor 410, a speaker 420, a timing controller board 430, a main board 440, and the like may be mounted on the rear surface of the PCB plate 400. The rigid bar 380 may be disposed between the electronic components. Hence, the present disclosure can effectively reduce defects in which the electronic components are damaged due to deformation of the frame 300 by an external force.

The material of the PCB plate 400 may be different from the material of the frame 300. For example, the PCB plate 400 may include metal. For example, the PCB plate 400 may be formed through a pressing process. The frame 300 and the PCB plate 400 may be fixed to each other through an adhesive member interposed between them, but the present disclosure is not limited thereto.

A back cover 500 may be disposed behind the frame 300. The back cover 500 may be disposed behind the PCB plate 400. The back cover 500 may be disposed to cover the electronic components positioned on the PCB plate 400 and may protect them. The back cover 500 may be fixed to the frame 300 through at least one fixing member. The fixing member may be a screw, but is not limited thereto.

The back cover 500 may include at least one groove 501 provided on an outer surface. The groove 501 may include one or more open holes 505 provided by penetrating a thickness of the back cover 500. The groove 501 may be a portion accommodating some of one or more cables 1501 and 1503 (see FIG. 17) and/or at least one connector 1500 (see FIG. 17). The open hole 505 may be a portion through which mechanisms for electrically connecting an electronic component disposed outside the back cover 500 to an electronic component disposed inside the back cover 500 pass, and the mechanisms extend in the open hole 505. The cables 1501 and 1503 (see FIG. 17) may transmit external power and/or signals to the electronic components positioned on the PCB plate 400. The connector 1500 may electrically connect the cable 1501 (see FIG. 17) to the electronic component positioned on the PCB plate 400.

An auxiliary cover 550 may be disposed behind the back cover 500. The auxiliary cover 550 may be positioned to cover the components positioned on the groove 501 and may protect them. The auxiliary cover 550 may be fixed to the back cover 500 through at least one fixing member. The auxiliary cover 550 and the back cover 500 may be fixed to each other through a fastening method using a grommet, but are not limited thereto.

FIGS. 4 to 7 illustrate a connection relationship between a display panel and a cable and a position relationship between a cable and a case member according to an embodiment of the present disclosure.

Referring to FIG. 4, a member layer 117 may extend from one side of the display panel 100. For example, the member layer 117 may have a shape extending from the second long side LS2 of the display panel 100. A plurality of member layers 117 may be provided. The member layers 117 may be electrically connected to the display panel 100. The member layer 117 may include at least one of a chip on film (COF), a chip on glass (COG), a flexible printed circuit board (FPCB), and a tape carrier package (TCP).

A source PCB 172 may have a shape extending from the member layer 117. The source PCB 172 may be electrically connected to the member layer 117. A plurality of source PCBs 172 may be provided.

A cable 190 may have a shape extending from the source PCB 172. The cable 190 may be electrically connected to the source PCB 172. A plurality of cables 190 may be provided.

The power or/and signal provided to the cable 190 may be delivered to the source PCB 172. The power or/and signal provided to the source PCB 172 may be distributed to the member layers 117. The power or/and signal distributed to the member layers 117 may be supplied to the display panel 110.

Referring to FIG. 5, the member layer 117 may be flexible. The member layer 117 may be bent toward the rear surface of the display panel 100. The source PCB 172 connected to the member layer 117 may be disposed behind the display panel 100. The cable 190 connected to the source PCB 172 may be disposed behind the display panel 100.

Referring to FIGS. 6 and 7, the cable 190 may extend toward the rear of the frame 300. The cable 190 may pass a lower portion of the inner plate 200 and pass through a slot 310 formed in the frame 300. One end of the cable 190 may pass through the slot 310 and may be electrically connected to the electronic component disposed behind the frame 300.

The inner plate 200 may have a smaller area than the display panel 100. In this case, since the cable 190 can extend through a free space of the lower portion of the inner plate 200, separate processing of the inner plate 200 may not be required.

FIGS. 8 to 16 illustrate detailed configuration of a display device according to an embodiment of the present disclosure.

Referring to FIGS. 8 to 16, the display device 10 may include the display panel 100 and a stand 600 positioned below the display panel 100. The stand 600 may support the display panel 100 coupled to a case member, such as the inner plate 200, the frame 300, the middle cabinet 350, the back cover 500, and the auxiliary cover 550, from the lower part of the display panel 100.

The stand 600 may include a top plate 610, a bottom plate 630, a first side plate 650, and a second side plate 670. The stand 600 may have a case shape penetrating in forward-rearward direction by a coupling structure of the bottom plate 630, the first side plate 650, and the second side plate 670.

The top plate 610 may define a shape of a top surface of the stand 600. Support mechanisms for supporting the display panel 100 may be disposed on the top plate 610. The support mechanisms may include a supporter guide 611 and a supporter head 612. The supporter guide 611 may be fixed to a first guide plate 1611 disposed behind the frame 300. The supporter head 612 may be fixed to a second guide plate 1612 disposed behind the frame 300.

The bottom plate 630 may define a shape of a lower surface of the stand 600. The bottom plate 630 may be disposed opposite the top plate 610 below the top plate 610 and may be spaced apart from the top plate 610 by a predetermined distance.

The first side plate 650 may define a shape of a right surface of the stand 600. The first side plate 650 may connect the top plate 610 and the bottom plate 630 at the right side of the top plate 610 and the bottom plate 630. That is, the first side plate 650 may connect the right side of the top plate 610 and the right side of the bottom plate 630.

The second side plate 670 may define a shape of a left surface of the stand 600. The second side plate 670 may connect the top plate 610 to the bottom plate 630 at the left side of the top plate 610 and the bottom plate 630. That is, the second side plate 670 may connect the left side of the top plate 610 and the left side of the bottom plate 630. The second side plate 670 may face the first side plate 650.

The first side plate 650 and the second side plate 670 may be fixed to the top plate 610 through at least one screw. For example, an angle bracket 680 may be interposed between the side plates 650 and 670 and the top plate 610. The side plates 650 and 670 and the angle bracket 680 may be fixed through a screw, and the top plate 610 and the angle bracket 680 may be fixed through a screw. It is preferable that the screw is fastened to a lower surface of the top plate 610 so that the screw is not exposed from an upper surface of the top plate 610. The first side plate 650 and the second side plate 670 may be fixed to the bottom plate 630 through at least one screw.

The top plate 610 may include the supporter guide 611. The supporter guide 611 may have a shape protruding upward from the top plate 610. A plurality of supporter guides 611 may be provided. The supporter guides 611 may be disposed along a longitudinal direction of the display panel 100, for example, the left-right direction. As the plurality of supporter guides 611 are provided, since the display panel 100, to which the case member is coupled, can be supported at a plurality of positions, it is possible to effectively restrain and limit shaking and twisting of the display panel 100.

The first guide plate 1611 may be disposed behind the frame 300. The number of first guide plates 1611 may correspond to the number of supporter guides 611. The first guide plate 1611 may be fixed to the frame 300 through a fixing member such as a screw. Alternatively, the first guide plate 1611 may be fixed to the rigid bar through a fixing member such as a screw. It may be preferable that the first guide plate 1611 is formed at the rigid bar to prevent deformation of the frame 300.

The first guide plate 1611 may include a guide groove 1611a into which the supporter guide 611 is inserted. The guide groove 1611a may be opened in a direction in which the supporter guide 611 extends. That is, the guide groove 1611a may be penetrated upward. Movement in the left-right direction of the supporter guide 611 inserted into the guide groove 1611a may be limited. Movement in the up-down direction of the supporter guide 611 inserted into the guide groove 1611a may not be limited.

The display device 10 may further include the supporter head 612. The supporter head 612 may be disposed on the upper surface of the top plate 610. A plurality of supporter heads 612 may be provided. The supporter heads 612 may be disposed adjacent to each other along the longitudinal direction of the display panel 100 of the display panel 100, for example, the left-right direction. In addition, the supporter heads 612 may be disposed adjacent to the supporter guide 611 along the left-right direction. The supporter head 612 may include a first hollow portion 612a. The first hollow portion 612a may be a part of the supporter head 612 penetrated in the up-down direction. Female threads may be formed on an inner surface of the first hollow portion 612a.

The second guide plate 1612 may be disposed behind the frame 300. The number of second guide plates 1612 may correspond to the number of supporter heads 612. The second guide plate 1612 may be fixed to the frame 300 through a fixing member such as a screw. Alternatively, the second guide plate 1612 may be fixed to the rigid bar through a fixing member such as a screw. It may be preferable that the second guide plate 1612 is formed on the rigid bar to prevent deformation of the frame 300.

The second guide plate 1612 may include a second hollow portion 1612a. The second hollow portion 1612a may be a part of the second guide plate 1612 penetrated in the up-down direction. Female threads may be formed on the inner surface of the second hollow portion 1612a.

The supporter head 612 and the second guide plate 1612 may be coupled through a screw 1613. The screw 1613 may be inserted into the first hollow portion 612a and the second hollow portion 1612a. Hence, the frame 300 and the stand 600 may be fixed to each other.

By distributing and providing a coupling structure of the supporter head 612 and the second guide plate 1612 in a plurality of positions, a predetermined fastening force between the frame 300 and the top plate 610 can be secured at a front surface of the top plate 610. In this case, as a central portion of the top plate 610 sags by the load of the display panel 100 and the case member, it is possible to prevent a defect in which a separation distance between the frame 300 and the top plate 610 varies depending on the position.

The stand 600 may include a bottom accommodation portion 700. The bottom accommodation portion 700 may be disposed below the bottom plate 630. The bottom accommodation portion 700 may include a bottom body 711, a first side body 712, a second side body 713, and a third side body 714. The bottom accommodation portion 700 may provide an accommodation space that is open rearward by a coupling structure of the bottom body 711, the first side body 712, the second side body 713, and the third side body 714.

The bottom body 711 may define a shape of a bottom surface of the bottom accommodation portion 700. The bottom body 711 may be disposed below the bottom plate 630 to face the bottom plate 630, and disposed to be spaced apart from the bottom plate 630 by a predetermined distance.

The first side body 712 may define a shape of a right surface of the bottom accommodation portion 700. The first side body 712 may connect the bottom body 711 to the bottom plate 630 at the right side of the bottom body 711 and the bottom plate 630. That is, the first side body 712 may connect the right side of the bottom body 711 to the right side of the bottom plate 630.

The second side body 713 may define a shape of a left surface of the bottom accommodation portion 700. The second side body 713 may connect the bottom body 711 to the bottom plate 630 at the left side of the bottom body 711 and the bottom plate 630. That is, the first side body 712 may connect the left side of the bottom body 711 to the left side of the bottom plate 630. The second side body 713 may face the first side body 712.

The third side body 714 may define a front shape of the bottom accommodation portion 700. The third side body 714 may connect the bottom body 711, the bottom plate 630, the first side body 712, and the second side body 713, at its front surface.

A box 800 having a predetermined accommodation space may be inserted into the accommodation space of the bottom accommodation portion 700. The box 800 may be provided in the accommodation space of the bottom accommodation portion 700 so as to be inserted and discharged along the forward-rearward direction.

The accommodation space of the box 800 may accommodate the components. The components may include an electronic component for applying electric power and/or signals to the electronic component disposed on the rear surface of the PCB plate 400. For example, the component may include a power supply 820 that supplies power to the power distributor 410 disposed on the rear surface of the PCB plate 400. Although described later, the electronic component disposed in the box 800 and the electronic component disposed on the rear surface of the PCB plate 400 may be electrically connected through one or more cables 1501 (see FIG. 17). In addition, the component may include a heat dissipation component for discharging heat generated in an environment inside the box 800 to the outside. For example, the heating component may include one or more fans 880.

The box 800 may be slidably inserted into the accommodation space of the bottom accommodation portion 700. To this end, the display device 10 may include guide rails 721 and 723 and sliders 851 and 853, that are fastened to the guide rails 721 and 723 and are slidably provided. The guide rails 721 and 723 may provide a moving path through which the sliders 851 and 853 can move along the forward-rearward direction.

The guide rails 721 and 723 may be disposed inside the bottom accommodation portion 700 at the left and right sides, respectively. For example, the guide rails 721 and 723 may include a first guide rail 721 and a second guide rail 723. The first guide rail 721 may be fixed to the inside of the first side body 712. The second guide rail 723 may be fixed to the inside of the second side body 713.

The first side body 712 may provide an inner space for accommodating the first guide rail 721. The second side body 713 may provide an inner space for accommodating the second guide rail 723. The inner space may be opened toward the inside of the bottom accommodation portion 700.

For example, the first side body 712 and the second side body 713 may be formed in a "⊏"-shape and may respectively accommodate the first guide rail 721 and the second guide rail 723.

The first side body 712 and the first guide rail 721 may be fixed to each other by a coupling structure of a convex portion and a concave portion. The first side body 712 and the first guide rail 721 may be fixed to each other by a first coupling structure and a second coupling structure for limiting movement in multiple directions.

For example, the first coupling structure may include a first convex portion 1712*a* formed on the first guide rail 721 and protruding toward the first side body 712, and a first concave portion 1712*b* formed in the first side body 712 and into which the first convex portion 1712*a* is inserted. Here, a direction in which the first convex portion 1712*a* protrudes may be the left-right direction. Alternatively, although not shown, the first coupling structure may include a first convex portion 1712*a* formed on the first side body 712 and protruding toward the first guide rail 721, and a first concave portion 1712*b* formed on the first guide rail 721 and into which the first convex portion 1712*a* is inserted.

The second coupling structure may include a second convex portion 1712*c* formed on the first side body 712 and protruding toward the first guide rail 721, and a second concave portion 1712*d* formed on the first guide rail 721 and into which the second convex portion 1712*c* is inserted. Alternatively, the second coupling structure may include a second convex portion 1712*c* formed on the first guide rail 721 and protruding toward the first side body 712 and a second concave portion 1712*c* formed in the first side body 712 and into which the second convex portion 1712*c* is inserted. Here, the direction in which the second convex portion 1712*c* protrudes may be the up-down direction intersecting the direction in which the first convex portion 1712*a* protrudes.

A coupling structure of the second side body 713 and the second guide rail 723 may be the same as the coupling structure of the first side body 712 and the first guide rail 721.

The sliders 851 and 853 may be disposed at the left and right sides outside the box 800, respectively. For example, the sliders 851 and 853 may include a first slider 851 and a third slider 853. The first slider 851 may be fixed to the outside of the box 800 so as to face the first guide rail 721. The first slider 851 may be slidably fastened to the first guide rail 721. The third slider 853 may be fixed to the outside of the box 800 so as to face the second guide rail 723. The third slider 853 may be slidably fastened to the second guide rail 723.

After the box 800 is inserted into the bottom accommodation portion 700, the box 800 may be detachably fixed to the bottom accommodation portion 700. To this end, the box 800 may further include a rear cover 803 disposed on the rear surface. The rear cover 803 may be fixed to the rear of the box 800. The rear cover 803 may cover the rear surface of the box 800, and may further extend in the left-right direction and cover at least a portion of the rear surface of the bottom accommodation portion 700. The extended portion of the rear cover 803 and the bottom accommodation portion 700 may be fixed to each other through a fixing member such as a screw.

A support member 750 for supporting a load of an upper structure may be further provided on the third side body 714. The support member 750 may be fixed inside the third side body 714. The third side body 714 may provide an inner space for accommodating the support member 750. The inner space may be opened toward the inside of the bottom accommodation portion 700. For example, the third side body 714 may be formed in a "⊏"-shape to accommodate the support member 750. For example, the support member 750 may have the same shape as the first guide rail 721 and the second guide rail 723.

The third side body 714 and the support member 750 may be fixed to each other by a coupling structure of a convex portion and a concave portion. The third side body 714 and the support member 750 may be fixed to each other by a first coupling structure and a second coupling structure for limiting movement in multiple directions. The first coupling structure may be the same as the first coupling structure between the first side body 712 and the first guide rail 721, and the second coupling structure may be the same as the second coupling structure between the second side body 713 and the second guide rail 723.

The top plate 610 may further include a buffer member 620. The buffer member 620 may be positioned on the upper surface of the top plate 610. The buffer member 620 may support, the display panel 100 to which the case member is coupled, from below. In other words, the buffer member 620 may support the frame 300 from below. The buffer member 620 may be a rubber, but is not limited thereto.

The buffer member 620 may be disposed to extend long along the left-right direction as one body. Alternatively, the buffer member 620 may be divided into a plurality of bodies and disposed at a plurality of positions, and adjacent buffer members 620 may be disposed adjacent to each other along the left-right direction.

The buffer member 620 may be fixed to the upper surface of the top plate 610. For example, as illustrated, a locking protrusion 615 protruding upward may be provided on the upper surface of the top plate 610, and the buffer member 620 may be provided with a locking groove into which the locking protrusion 615 can be fitted. For another example, although not illustrated, a locking groove 625 extending along the left-right direction may be provided on the upper surface of the top plate 610, and the buffer member 620 may be fitted into the locking groove 625.

As the buffer member 620 fills the space between the top plate 610 and the display panel 100 to which the case members are coupled, the present disclosure can prevent a gap from being formed between the frame 300 and the top plate 610 due to the sagging of the central portion of the top plate 610 resulting from the load of the display panel 100 and the case members.

FIGS. 17 to 19 illustrate a cable compartment included in a stand according to an embodiment of the present disclosure.

Referring to FIGS. 17 to 19, the stand 600 may include cable compartments 1000-1 and 1000-2. The cable compartments 1000-1 and 1000-2 may accommodate cables 1501 and 1503 for transmitting power and/or signals to the electronic components disposed on the rear surface of the PCB plate 400.

The top plate 610 may include one or more top accommodation portions 610*a* having an inner space that is opened rearward. A plurality of top accommodation portions 610*a* may be provided, if necessary or desired. The top plate 610 may include one or more top holes 613 open upward. The top hole 613 may open the top accommodation portion 610*a* toward the display panel 100 and/or the case member.

The first side plate 650 may include a first side accommodation portion 650*a* having an inner space opened rearward. The first side accommodation portion 650*a* may communicate with the top accommodation portion 610*a*.

That is, the first side accommodation portion 650a and the top accommodation portion 610a may be connected to form one inner space.

The first side accommodation portion 650a may include a first side hole 651 opened toward the bottom accommodation portion 700. The bottom accommodation portion 700 may include a bottom hole 712a opened toward the first side hole 651. The bottom hole 712a may be formed in the first side body 712. In addition, the box 800 inserted into the bottom accommodation portion 700 may include a box hole 800a opened toward the first side hole 651.

The second side plate 670 may include a second side accommodation portion 670a having an inner space opened rearward. The second side accommodation portion 670a may communicate with the top accommodation portion 610a. That is, the second side accommodation portion 670a and the top accommodation portion 610a may be connected to form one inner space. The top accommodation portion 610a communicating with the second side accommodation portion 670a may be a separate accommodation portion distinguished from the top accommodation portion 610a communicating with the first side accommodation portion 650a.

The second side plate 670 may include a second side hole 671 opened toward the outside. It may be preferable that the second side hole 671 is opened downward and/or rearward.

The top accommodation portion 610a, the first side accommodation portion 650a, and the bottom accommodation portion 700 may constitute a first cable compartment 1000-1. The first cable compartment 1000-1 may accommodate at least one cable 1501 electrically connecting the electronic component disposed at the rear surface of the PCB plate 400 to the component accommodated in the box 800. That is, the cable 1501 may pass through the groove 501 of the back cover 500 and may be provided to the stand 600. The cable 1501 provided to the stand 600 may pass through the top hole 613 and extend to the top accommodation portion 610a and the first side accommodation portion 650a. The extended cable 1501 may pass through the first side hole 651, the bottom hole 712a, and the box hole 800a and may be connected to the component included in the bottom box 800.

The top accommodation portion 610a and the second side accommodation portion 670a may constitute a second cable compartment 1000-2. The second cable compartment 1000-2 may accommodate at least one cable 1503 electrically connecting the electronic components disposed at the rear surface of the PCB plate 400 to external components and/or external power source. That is, the cable 1503 may pass through the groove 501 of the back cover 500 and may be provided to the stand 600. The cable 1503 provided to the stand 600 may pass through the top hole 613 and extend to the top accommodation portion 610a and the second side accommodation portion 670a. The extended cable 1503 may pass through the second side hole 671 and may be exposed to the outside.

The stand 600 may further include a cable cover 900 for opening and closing the cable compartment. The cable cover 900 may be detachably coupled to at least one of the top accommodation portion 610a, the first side accommodation portion 650a, and the second side accommodation portion 670a. The cable cover 900 may prevent the separation of the cable accommodated in the top accommodation portion 610a, the first side accommodation portion 650a, and the second side accommodation portion 670a.

For example, the cable cover 900 may be provided to close the inner space that is open toward the rear of the top accommodation portion 610a. The cable cover 900 may be fitted and coupled to the top accommodation portion 610a. To this end, the cable cover 900 may include fitting protrusions 901a and 901b, and the top accommodation portion 610a may include fitting grooves 903a and 903b provided inside and into which the fitting protrusions 901a and 901b are inserted. The fitting protrusions 901a and 901b may include a first fitting protrusion 901a protruding upward and a second fitting protrusion 901b protruding downward. The fitting grooves 903a and 903b may include a first fitting groove 903a into which the first fitting protrusion 901a is inserted and a second fitting groove 903b into which the second fitting protrusion 901b is inserted.

The cable cover 900 may be made of a material having a predetermined elasticity. The first fitting protrusion 901a and the second fitting protrusion 901b of the cable cover 900 may move upward along the inner surface of the top accommodation portion 610a, and then may be seated in the first fitting groove 903a and the second fitting groove 903b. In this case, the cable cover 900 may maintain a state seated in the top accommodation portion 610a unless a separate external force is provided.

FIGS. 20 and 21 illustrate a heat dissipation structure according to an embodiment of the present disclosure.

Referring to FIGS. 20 and 21, the display device may further include a heat dissipation mechanism for dissipating heat generated in the components accommodated in the box 800 to the outside.

The box 800 may include an air inlet 871 serving as a path through which the air is introduced, and an air outlet 873 serving as a path through which the air is discharged. The air inlet 871 may include inlet slits 871a that are opened rearward. The air outlet 873 may include outlet slits 873a that are opened rearward. The inlet slits 871a may be positioned adjacent to one side (e.g., right side) of the box 800, the outlet slits 873a may be positioned adjacent to the other side (e.g., left side) of the box 800.

The heat dissipation mechanism may include one or more fans 880. The fan 880 may be disposed adjacent to the outlet slits 873a of the air outlet 873 in the box 800. The fan 880 may form a difference between an internal air pressure and an external air pressure. As the external air pressure increases by the fan 880 compared to the internal air pressure, the external air may be introduced into the box 800 through the air inlet 871. The air introduced through the air inlet 871 may be discharged to the outside of the box 800 by the fan 880 after cooling the components accommodated in the box 800.

A plurality of fans 880 may be provided. For example, the fan 880 may include a first fan 881 and a second fan 883 disposed closer to the outlet slits 873a of the air outlet 873 than the first fan 881.

Air vents 881a and 883a of the first fan 881 and the second fan 883 may have a predetermined discharge direction. A discharge direction of the fan 880 may correspond to a direction in which the air vents 881a and 883a are opened. The discharge direction of the fan 880 may be selected in consideration of air flow efficiency. To this end, a discharge direction of the first fan 881 and a discharge direction of the second fan 883 may be different from each other. The discharge direction of the first fan 881 may be tilted by a predetermined angle α from the discharge direction of the second fan 883. For example, the discharge direction of the second fan 883 may be directed toward the outlet slits 873a. The discharge direction of the first fan 881 may be directed toward a direction tilted by the predetermined angle from the discharge direction of the second fan 883. Here, the predetermined angle may be an acute angle or a right angle. The discharge direction of the first fan 881 may be directed toward the other side (e.g., left side) of the box 800. If necessary, a duct for guiding the air flow path may be further provided considering the selected orientation direction.

FIGS. 22 to 24 illustrate a sound reflector according to an embodiment of the present disclosure.

Referring to 22 to 24, the display device may further include a sound reflector 950. The sound reflector 950 may control a path of sound provided from the speaker 420. That is, the sound reflector 950 changes a path of sound provided from the speaker 420 and may control the path so that the sound is directed to the front where a user is located. Thus, the display device according to an embodiment of the present disclosure has an advantage of providing a sound with high quality to the user by minimizing a sound loss.

The sound reflector 950 may be positioned on the lower surface of the top plate 610. Sound generated by the speaker 420 disposed on the rear surface of the PCB plate 400 may be provided to the front by changing a path by the sound reflector 950 disposed on the lower surface of the top plate 610. To reduce the sound loss, the top plate 610 may include a sound hole 617. The sound hole 617 may overlap the speaker 420 in the up-down direction. The sound hole 617 may overlap the sound reflector 950 in the up-down direction.

The sound reflector 950 may include a fixing portion 951 and an inclined portion 953.

The fixing portion 951 may be a portion fixed to the lower surface of the top plate 610. The fixing portion 951 may be detachably coupled to the top plate 610. For example, a magnet 910 and an auxiliary plate 920 detachably provided to the magnet 910 may be further included as a fixing mechanism for fixing the fixing portion 951 and the top plate 610. The auxiliary plate 920 may be a ferromagnetic substance. The magnet 910 may be fixed to an upper surface of the fixing portion 951 through at least one fixing member. The auxiliary plate 920 may be fixed to the lower surface of the top plate 610 through at least one fixing member. The fixing member may be a screw, but is not limited thereto.

The inclined portion 953 extends from the fixing portion 951 and may have a shape inclined with respect to the fixing portion 951 by a predetermined angle. As the inclined portion 953 has a predetermined inclination, a distance between the inclined portion 953 and the top plate 610 may gradually increase as it goes from the rear to the front. The inclined portion 953 may overlap the sound hole 617 in the vertical direction. That is, the sound hole 617 exposes the inclined portion 953 positioned below the top plate 610, but may be opened toward the speaker 420. Thus, the sound provided from the speaker 420 may be transmitted to the user positioned at the front after the path is changed in the inclined portion 953 through the sound hole 617.

Certain embodiments or other embodiments of the present disclosure described above are not mutually exclusive or distinct from each other. Any or all elements of the embodiments of the present disclosure described above may be combined or combined with each other in configuration or function.

For example, a configuration "A" described in one embodiment of the present disclosure and the drawings and a configuration "B" described in another embodiment of the present disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of the present disclosure. More particularly, various variations and modifications are possible in the component parts and/or arrangements of the subject combination arrangement within the scope of the present disclosure, the drawings and the appended claims. In addition to variations and modifications in the component parts and/or arrangements, alternative uses will also be apparent to those skilled in the art.

The invention claimed is:

1. A display device comprising:
a display panel;
a frame disposed behind the display panel and coupled to the display panel;
a stand configured to support the frame at a lower part of the display panel;
a bottom accommodation portion fixed to a lower part of the stand, the bottom accommodation portion having an inner space that is opened rearward; and
a box slidably inserted into the inner space, the box having an accommodation space provided inside the box,
wherein the stand comprises:
a top plate;
a bottom plate disposed opposite the top plate below the top plate and spaced apart from the top plate;
a first side plate configured to connect the top plate to the bottom plate at one side of the top plate and the bottom plate; and
a second side plate configured to connect the top plate to the bottom plate at other side of the top plate and the bottom plate, the second side plate being opposite to the first side plate,
wherein the bottom accommodation portion is coupled to a lower part of the bottom plate.

2. The display device of claim 1, further comprising:
sliders fixed to outsides of both ends of the box; and
guide rails fixed to insides of both ends of the bottom accommodation portion and configured to guide the sliders to slide forward or rearward.

3. The display device of claim 2, wherein the bottom accommodation portion comprises:
a bottom body disposed opposite the bottom plate below the bottom plate;
a first side body configured to connect the bottom body to the bottom plate at one side;
a second side body configured to connect the bottom body to the bottom plate at other side; and
a third side body configured to connect the bottom body to the bottom plate at a front surface,
wherein the first and second side bodies are formed in a "⊏"-shape and accommodate the guide rails.

4. The display device of claim 3, wherein the guide rails and the first and second side bodies comprise a first convex portion, a first concave portion, a second convex portion and a second concave portion,
wherein the first convex portion is insert into the first concave portion, and the second convex portion is insert into the second concave portion,
wherein one of the first convex portion and the second concave portion is formed on an upper surface and a lower surface of the guide rails, and wherein the other of the first convex portion and the second concave portion is formed on a side surface of the guide rails.

5. The display device of claim 3, further comprising:
a support member provided in the bottom accommodation portion,
wherein the third side body is formed in a "⊏"-shape and accommodates the support member.

6. The display device of claim 3, wherein the top plate comprises:
a top accommodation portion having a predetermined inner space that is opened rearward; and
a top hole configured to open at least a part of the top accommodation portion toward the display panel,
wherein at least one of the first and second side plates comprises a side accommodation portion having a predetermined inner space, that is opened rearward, and communicating with the top accommodation portion,
wherein the bottom accommodation portion communicates with the side accommodation portion, and
wherein the box communicates with the bottom accommodation portion.

7. The display device of claim 6, further comprising:
an electronic component disposed behind the frame and configured to transmit a predetermined electric power or signal to the display panel;
a back cover disposed behind the frame and configured to accommodate the electronic component;
a component accommodated in the box; and
a cable configured to electrically connect the electronic component to the component,
wherein the cable passes through the top hole and is accommodated in the top accommodation portion, the side accommodation portion, the bottom accommodation portion, and the box.

8. The display device of claim 1, further comprising:
a fan provided in the box,
wherein the box comprises:
an air inlet comprising inlet slits that are opened rearward at one side; and
an air outlet comprising outlet slits that are opened rearward at other side,
wherein the fan is disposed adjacent to the air outlet.

9. The display device of claim 8, wherein the fan comprises:
a first fan having a first discharge direction; and
a second fan disposed closer to the air outlet than the first fan and having a second discharge direction,
wherein the first discharge direction is different from the second discharge direction.

10. The display device of claim 9, wherein the second discharge direction is directed toward the outlet slits,
wherein the first discharge direction is directed toward a direction tilted by a predetermined angle from the second discharge direction, and
wherein the predetermined angle is an acute angle or a right angle.

* * * * *